(12) United States Patent
Park

(10) Patent No.: US 11,755,075 B2
(45) Date of Patent: Sep. 12, 2023

(54) METHOD FOR MOVING PART OF ELECTRONIC DEVICE, AND ELECTRONIC DEVICE FOR SUPPORTING SAME

(71) Applicant: SAMSUNG ELECTRONICS CO., LTD., Suwon-si (KR)

(72) Inventor: Juyeol Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 140 days.

(21) Appl. No.: 17/542,137

(22) Filed: Dec. 3, 2021

(65) Prior Publication Data

US 2022/0091641 A1 Mar. 24, 2022

Related U.S. Application Data

(63) Continuation of application No. PCT/KR2020/007247, filed on Jun. 4, 2020.

(30) Foreign Application Priority Data

Jun. 4, 2019 (KR) ........................ 10-2019-0066190

(51) Int. Cl.
| | | |
|---|---|---|
| *G06F 1/16* | (2006.01) | |
| *G06F 1/20* | (2006.01) | |
| *H04M 1/02* | (2006.01) | |

(52) U.S. Cl.
CPC .......... *G06F 1/1677* (2013.01); *G06F 1/1624* (2013.01); *G06F 1/1686* (2013.01);
(Continued)

(58) Field of Classification Search
CPC .... G06F 1/1677; G06F 1/1624; G06F 1/1686; G06F 1/206; G06F 1/203
(Continued)

(56) References Cited

U.S. PATENT DOCUMENTS 6,452,155 B1 9/2002 Sherlock et al.
10,061,396 B1 * 8/2018 Shibayama ........... G06F 1/1616
(Continued)

FOREIGN PATENT DOCUMENTS

| CN | 108965508 | 12/2018 |
|---|---|---|
| EP | 3 477 920 | 5/2019 |

(Continued)

OTHER PUBLICATIONS

Partial Supplementary European Search Report dated Jun. 24, 2022 in corresponding European Patent Application No. EP20818137.0.
(Continued)

*Primary Examiner* — Tom V Sheng
(74) *Attorney, Agent, or Firm* — Nixon & Vanderhye, P.C.

(57) ABSTRACT

An electronic device according to embodiments of the present disclosure may include: a first housing, a second housing coupled to the first housing, and configured to move in a first direction from a first position to a second position or in a second direction opposite the first direction between the first position at least in part accommodated in the first housing and the second position protruding from the first housing, a driving unit comprising a driving motor configured to move the second housing in the first direction or the second direction, a first sensor configured to detect a position of the second housing, at least one processor operably coupled with the driving unit and the first sensor, and a memory operably coupled with the at least one processor, wherein the memory may store instructions which, when executed, cause the at least one processor to: detect an input for moving the second housing in the first direction, control
(Continued)

the driving unit to drive the driving unit for a first time to move the second housing in the first direction, identify whether the second housing is positioned at the second position through the first sensor, in response to identifying that the second housing is not positioned at the second position, control the driving unit to drive the driving unit for a second time to move the second housing in the second direction, and control the driving unit to drive the driving unit for the second time, and control the driving unit to drive the driving unit for a third time to move the second housing in the first direction.

15 Claims, 21 Drawing Sheets

(52) U.S. Cl.
CPC ............ *G06F 1/206* (2013.01); *G06F 1/1684* (2013.01); *G06F 1/203* (2013.01); *H04M 1/0237* (2013.01); *H04M 1/0264* (2013.01); *H04M 2250/12* (2013.01)

(58) Field of Classification Search
USPC ......................................................... 345/101
See application file for complete search history.

(56) References Cited

U.S. PATENT DOCUMENTS

| | | | |
|---|---|---|---|
| 10,401,982 | B2 | 9/2019 | Seo et al. |
| 2010/0259509 | A1* | 10/2010 | Jin ...................... H04M 1/0245 345/184 |
| 2014/0333831 | A1* | 11/2014 | Oh ........................ H04M 1/185 348/376 |
| 2016/0070305 | A1 | 3/2016 | Kim et al. |
| 2017/0174181 | A1 | 6/2017 | Guibert et al. |
| 2017/0373688 | A1* | 12/2017 | Kitade .................. G06F 1/1618 |
| 2018/0007632 | A1* | 1/2018 | Chen .................. H04W 52/0254 |
| 2020/0059542 | A1* | 2/2020 | Chen ................... H04M 1/0264 |
| 2020/0329131 | A1* | 10/2020 | Han ...................... G06F 1/1658 |

FOREIGN PATENT DOCUMENTS

| | | |
|---|---|---|
| KR | 10-2005-0112737 | 12/2005 |
| KR | 10-2007-0030006 | 3/2007 |
| KR | 10-2015-0053609 | 5/2015 |
| KR | 10-2016-0089480 | 7/2016 |
| KR | 10-2018-0035606 | 4/2018 |

OTHER PUBLICATIONS

Extended European Search Report dated Nov. 8, 2022 issued by the European Patent Office for European Patent Application No. 20818137.0.

* cited by examiner

METHOD FOR MOVING PART OF ELECTRONIC DEVICE, AND ELECTRONIC DEVICE FOR SUPPORTING SAME

CROSS-REFERENCE TO RELATED APPLICATIONS

This application is a continuation of International Application No. PCT/KR2020/007247 designating the United States, filed on Jun. 4, 2020, in the Korean Intellectual Property Receiving Office and claiming priority to Korean Patent Application No. 10-2019-0066190, filed on Jun. 4, 2019, in the Korean Intellectual Property Office, the disclosures of which are incorporated by reference herein in their entireties.

BACKGROUND

Field

Embodiments of the disclosure relate to a method for moving part of an electronic device and the electronic device supporting the same.

Description of Related Art

As it becomes common to carry or use an electronic device such as a smart phone, user's demand for appearance of the electronic device is diversified. For example, in consideration of portability and ease of use, user's demand for an electronic device for providing a wider screen while being miniaturized is growing.

By mounting in the electronic device a display having a screen display area which is substantially the same as a front surface area of a housing of the electronic device, the user demand for the portability and the ease of use may be satisfied.

Recently, to satisfy user demand, an electronic device is developed by implementing at least one electronic component (e.g., a camera module) disposed on a front surface of the electronic device to be accommodated in the electronic device if a function related to the at least one electronic component is not executed and to protrude out of the electronic device if the function is executed.

Such an electronic device may include a driving unit including a driving motor, for converting rotational movement into linear motion, and the at least one electronic component may be accommodated in the electronic device or protruded out of the electronic device, by moving a housing accommodating the at least one electronic component (e.g., a camera module) by the driving of the driving unit.

According to a temperature change of the electronic device, characteristics of some of mechanical structures including the driving unit and accommodating at least one electronic component into the electronic device or protruding it out of the electronic device may be changed. In addition, a foreign substance may be introduced to some of the mechanical structures.

If the characteristics change or the foreign substance is introduced according to the temperature change, the operation of moving the housing which accommodates the at least one electronic component may not be normally performed.

SUMMARY

Embodiments of the disclosure provide a method for moving part of an electronic device and the electronic device supporting the same, for normally sliding a housing which accommodates at least one electronic component, by minimizing and/or reducing the influence of the temperature change of the electronic device and the foreign substance introduction.

Technical problems to be achieved by the present disclosure are not limited to the technical problems mentioned above, and other technical problems not mentioned may be clearly understood by those skilled in the technical field to which the present disclosure belongs from the following descriptions.

An electronic device according to example embodiments of the present disclosure, may include: a first housing, a second housing coupled to the first housing, and configured to move in a first direction from a first position to a second position or in a second direction opposite to the first direction between the first position at least in part accommodated in the first housing and the second position protruding from the first housing, a driving unit comprising a driving motor configured to move the second housing in the first direction or the second direction, a first sensor configured to detect a position of the second housing, at least one processor operably coupled with the driving unit and the first sensor, and a memory operably coupled with the at least one processor, wherein the memory may store instructions which, when executed, cause the at least one processor to: detect an input for moving the second housing in the first direction, control the driving unit to drive the driving unit for a first time to move the second housing in the first direction, identify whether the second housing is positioned at the second position through the first sensor, in response to identifying that the second housing is not positioned at the second position, control the driving unit to drive the driving unit for a second time to move the second housing in the second direction, and control the driving unit to drive the driving unit for the second time, and control the driving unit to drive the driving unit for a third time to move the second housing in the first direction.

An electronic device according to example embodiments of the present disclosure, may include: a first housing, a second housing coupled to the first housing, and configured to move in a first direction from a first position to a second position or in a second direction opposite to the first direction between the first position at least in part accommodated in the first housing and the second position protruding from the first housing, a driving unit comprising a driving motor configured to move the second housing in the first direction or the second direction, a first sensor configured to detect a temperature of the electronic device, a second sensor configured to detect a position of the second housing, at least one processor operably coupled with the driving unit, the first sensor, and the second sensor, and a memory operably coupled with the at least one processor, wherein the memory may store instructions which, when executed, cause the at least one processor to: detect an input for moving the second housing in the first direction, obtain information of the temperature of the electronic device through the first sensor, based on the temperature being a specified first temperature, control the driving unit to drive the driving unit for a first time at a first driving frequency to move the second housing in the first direction, identify whether the second housing is positioned at the second position through the first sensor, in response to identifying that the second housing is not positioned at the second position, control the driving unit to drive the driving unit for a second time at a second driving frequency to move the second housing in the second direction, and control the driving unit to drive the driving unit for the second time, and control the driving unit to drive the driving unit for a third time at a third driving frequency to move the second housing in the first direction, and based on the temperature being a specified second temperature, control the driving unit to drive the driving unit for the first time at a fourth driving frequency to move the second housing in the first direction, identify whether the second housing is positioned at the second position through the first sensor, in response to identifying that the second housing is not positioned at the second position, control the driving unit to drive the driving unit for the second time at a fifth driving frequency to move the second housing in the second direction, and control the driving unit to drive the driving unit for the second time, and control the driving unit to drive the driving unit for the third time at a sixth driving frequency to move the second housing in the first direction.

An electronic device according to example embodiments of the present disclosure, may include: a first housing, a second housing coupled to the first housing, and configured to move in a first direction from a first position to a second position or in a second direction opposite the first direction between the first position at least in part accommodated in the first housing and the second position protruding from the first housing, a driving unit comprising a driving motor configured to move the second housing in the first direction or the second direction, at least one position sensor configured to detect a position of the second housing, at least one processor operably coupled with the driving unit and the at least one position sensor, and a memory operably coupled with the at least one processor, wherein the memory may store instructions which, when executed, cause the at least one processor to: detect an input for moving the second housing in the first direction, control the driving unit to drive the driving unit to move the second housing in the first direction, based on the position of the second housing being a first position, control the driving unit to drive at a first driving frequency, and based on the position of the second housing being a second position, control the driving unit to drive at a second driving frequency.

By minimizing and/or reducing influence of a temperature change of an electronic device and foreign substance introduction, a housing accommodating at least one electronic component may slide normally.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
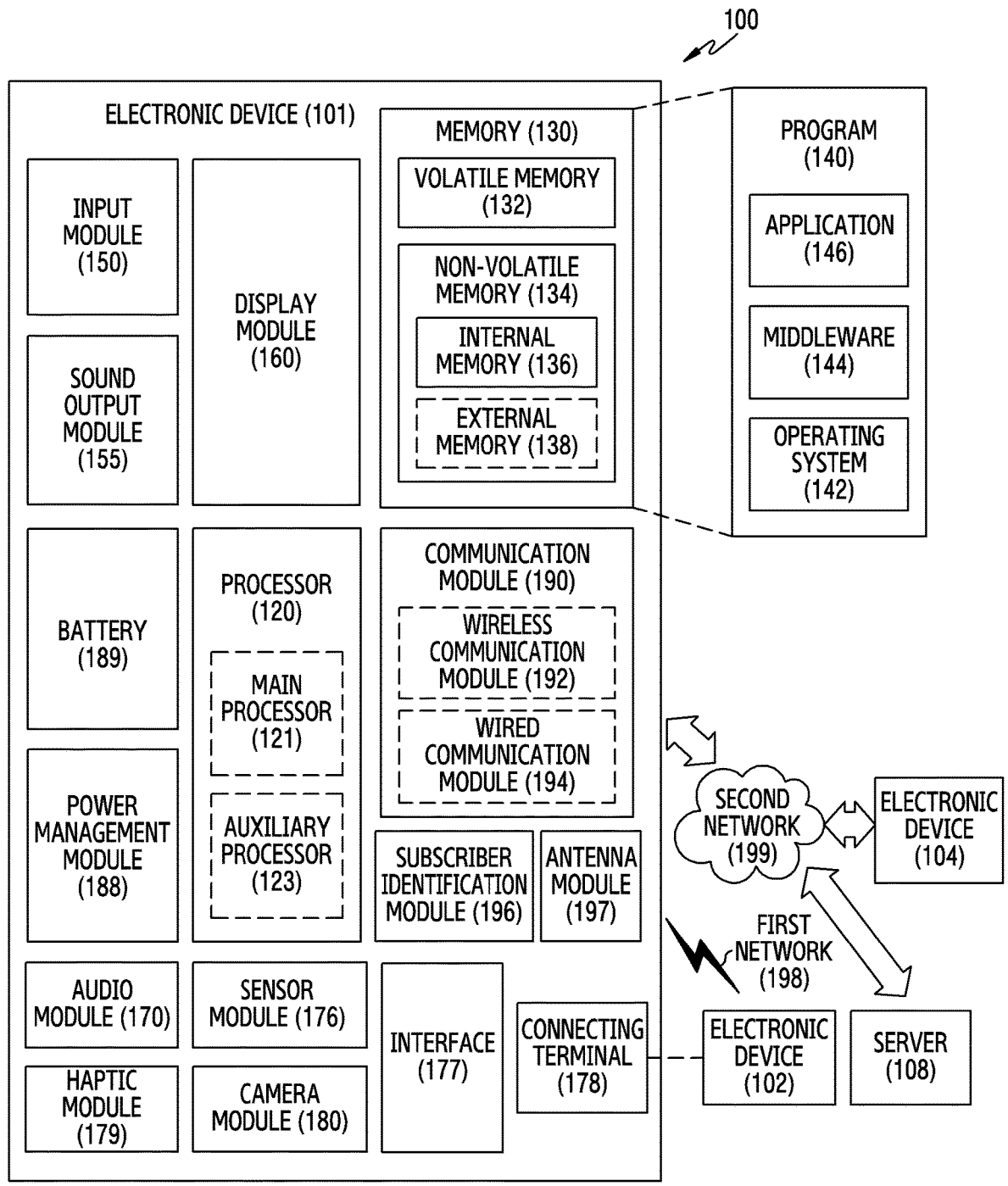
FIG. 1 is a block diagram illustrating an example electronic device in a network environment, according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
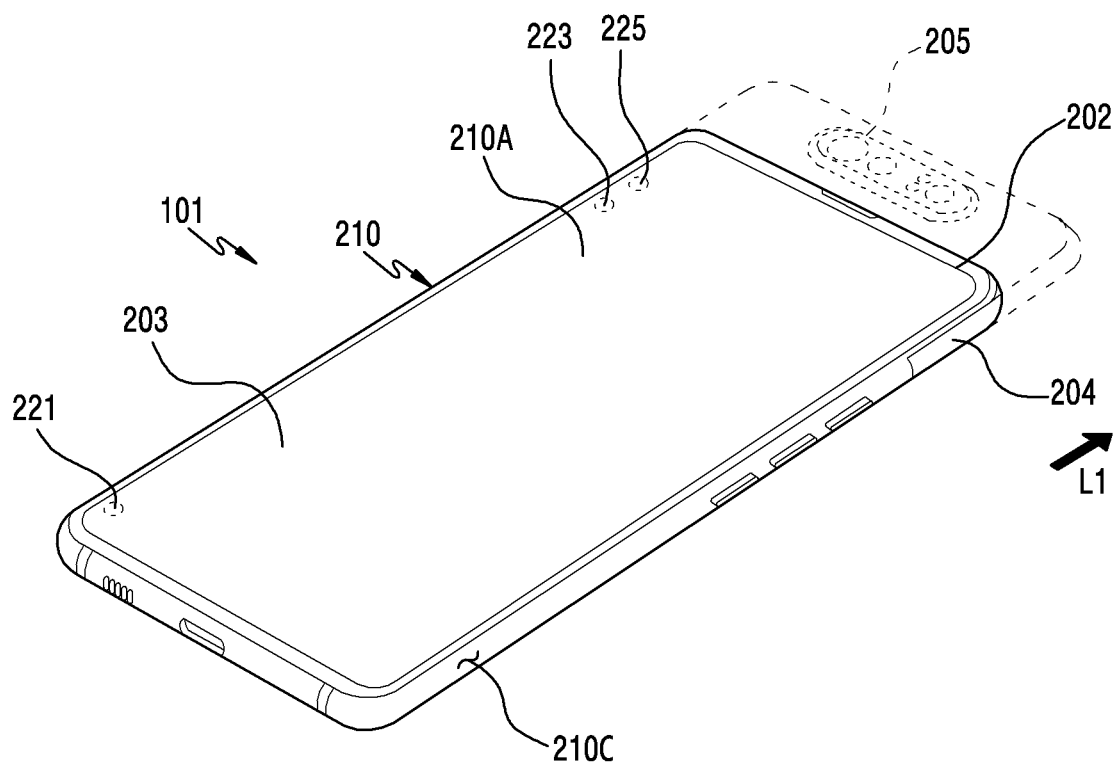
FIG. 2A is a front perspective view of an electronic device, according to various embodiments.

FIG. 2A is a front perspective view illustrating a front surface of an electronic device, according to various embodiments.

Figure 2B:
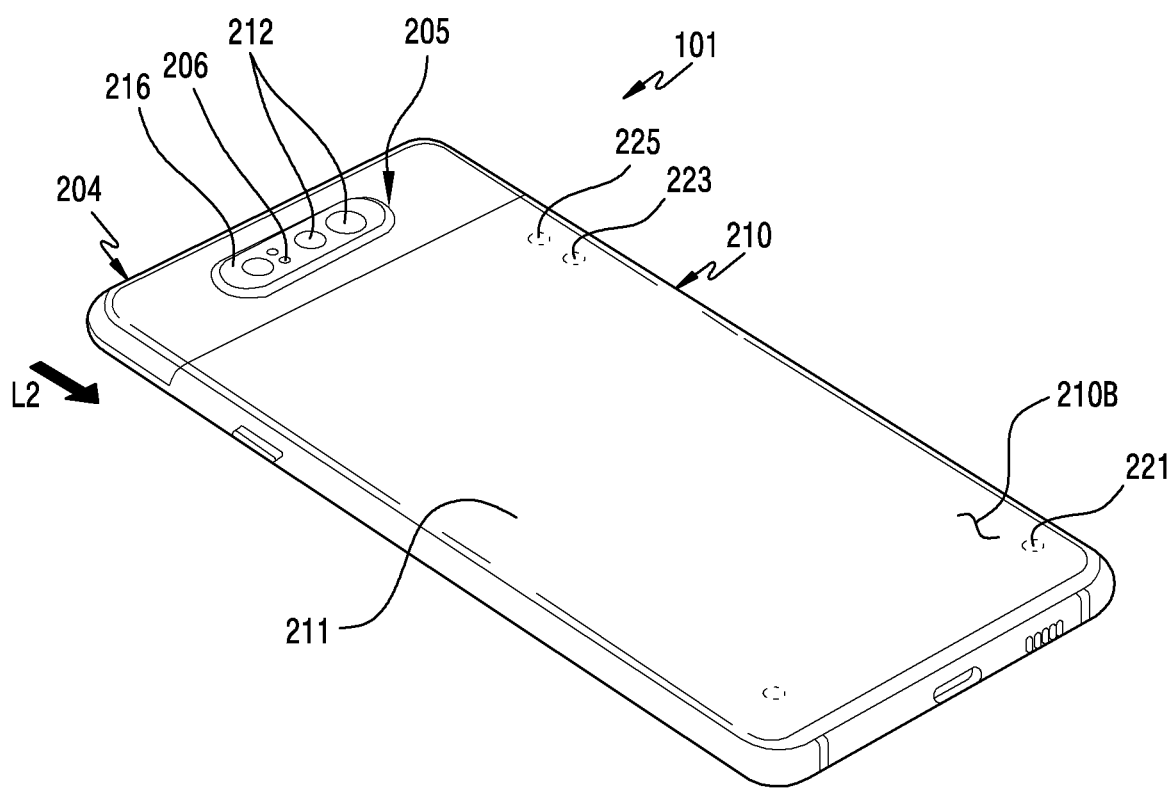
FIG. 2B is a rear perspective view of an electronic device, according to various embodiments.

FIG. 2B is a rear perspective view illustrating a rear surface of an electronic device 101, according to various embodiments.

Referring to FIG. 2A and FIG. 2B, in an embodiment, the electronic device 101 may include a first housing 210 including a first surface 210A (or a front surface), a second surface 210B (or a rear surface), and a side surface (or a sidewall) 210C which surrounds a space between the first surface 210A and the second surface 210B. In an embodiment, the first surface 210A may be a surface facing substantially the same direction as a direction which a display 203 faces, and the second surface 210B may be a surface facing a different (e.g., opposite) direction from the direction which the first surface 210A faces. In an embodiment, the first housing 210 may refer to a structure which forms part of the first surface 210A, the second surface 210B, and the side surfaces 210C.

In an embodiment, the first surface 210A may be formed by a front plate (or a front cover) 202 which is substantially at least in part transparent. In an embodiment, the front plate 202 may include a curved portion which is bent and seamlessly extended in at least one side edge portion from the first surface 210A toward a rear plate 211.

In an embodiment, the second surface 210B may be formed by a substantially opaque rear plate (or a rear cover) 211. In an embodiment, the rear plate 211 may include a curved portion which is bent and seamlessly extended in at least one side edge portion from the second surface 210B toward the front plate 202.

In an embodiment, the side surface 210C may be coupled with the front plate 202 and the rear plate 211.

In an embodiment, the first surface 210A, the side surface 210C, and the rear surface 210B of the electronic device may be integrated into one. At this time, the display 203 may be extended from the front surface and integrally configured to the rear surface. An integrated electronic device including all surfaces of the electronic device as one display may be implemented depending on a type of the display 203, and this display configuration of the electronic device 101 is not limited to the above-described forms. In an embodiment, the electronic device 101 may include the display 203. In an embodiment, the display 203 may be visible through most portion of the front plate 202. For example, a spacing between an outer periphery of the display 203 and an outer periphery of the front plate 202 may be formed to be substantially the same. In an embodiment, a recess or an opening may be formed in part of a screen display area of the display 203. In an embodiment, the electronic device 101 may include at least one of an electronic component aligned with the recess or the opening, the recess or the opening, and electronic components (e.g., a camera module, a proximity sensor, or a luminance sensor not shown).

In an embodiment, the electronic device 101 may include a second housing 204 which is movable (e.g., slidably movably) with respect to the first housing 210 (or relatively to the first housing 210).

In an embodiment, the second housing 204 may move between a first position (e.g., a first position P1 of FIG. 5) (hereafter, a position of the second housing 204 with the second housing 204 accommodated in the first housing 210 may be referred to as a 'first position') at which the second housing 204 is accommodated (or inserted) in the first housing 210 and a second position (e.g., a second position P2 of FIG. 5) (hereafter, a position of the second housing 204 at which the second housing 204 protrudes from the second housing 204 may be referred to as a 'second position') at which the second housing 204 is protruded (or drawn) from the first housing 210.

In an embodiment, the second housing 204 may be fully accommodated in the first housing 210, at the first position P1. In an embodiment, the second housing 204 may fully protrude from the first housing 210, at the second position P2.

In an embodiment, the second housing 204 may be configured in size smaller than the first housing 210. For example, if a horizontal length of the second housing 204 is smaller than a horizontal length of the first housing 210, the second housing 204 may be configured to be include in at least part of the first housing 210, and to pop up out of the first housing 210 if the user wants camera execution.

In an embodiment, the second housing 204 may move in a first direction L1 from the first position P1 to the second position P2 and thus protrude from the first housing 210, and move in a second direction L2 from the second position P2 to the first position P1 and thus be accommodated in the first housing 210. In an embodiment, the second direction L2 may be a reverse direction (e.g., an opposite direction) of the first direction L1. In an embodiment, a path of the second housing 204 moving from the first position P1 to the second position P2 (or a path moving from the second position P2 to the first position P1) may be substantially straight. However, it is not limited thereto, and, for example, the path through which the second housing 204 moves from the first position P1 to the second position P2 may be substantially curved. Hereafter, moving the second housing 204 in the first direction L1 may refer to moving the second housing 204 from the first position P1 to the second position P2 or moving the second housing. 204 in the first direction L1 between the first position P1 and the second position P2. In addition, moving the second housing 204 in the second direction L2 may refer to moving the second housing 204 from the second position P2 to the first position P1 or moving the second housing 204 in the second direction L2 between the first position P1 and the second position P2.

In an embodiment, the electronic device 101 may include an optical module 205. In an embodiment, the optical module 205 may include (or embed) at least one electronic component. For example, the optical module 205 may include, as at least one electronic component, at least one of a camera 212, a flash 206 (or a light emitting device), or an infrared projector 216. However, it is not limited thereto, and the optical module 205 may further include a luminance sensor or a proximity sensor in addition to the camera 212, the flash 206, and the infrared projector 216.

In an embodiment, the optical module 205 may be rotatably coupled (or accommodated, or mounted) to the second housing 204. In an embodiment, the optical module 205 may rotate while the second housing 204 protrudes from the first housing 210 or is accommodated in the first housing 210 (or while the second housing 204 moves with respect to the first housing 210). In an embodiment, the optical module 205 may be disposed to face substantially the same as the direction which the first surface 210A of the first housing 210 faces while the second housing 204 is at the first position P1, and may be disposed to face substantially the same direction as the direction which the second surface 210B of the first housing 210 faces while the second housing 204 is at the second position P2. The direction which the optical module 205 faces may be a direction in which at least one of the camera 212, the flash 206, or the infrared projector 216 included in the optical module 205 faces for photographing or a direction in which light is emitted.

In an embodiment, at least one camera 212 included in the optical module 205 may capture a subject in a different (e.g., opposite) direction from a direction in which the display 203 outputs the screen, if the second housing 204 is positioned at the first position P1. The camera 212 may capture the subject in the same direction as the direction in which the display 203 outputs the screen, if the second housing 204 is positioned at the second position P2.

In an embodiment, the electronic device 101 may include a first sensor 221 (e.g., a temperature sensor or a thermistor) (hereafter, referred to as a 'first sensor') for detecting (or measuring, or sensing) the temperature of the electronic device 101. In an embodiment, the first sensor 221 may be disposed (or mounted) at a distance apart from the electronic components included in the electronic device 101, to minimize and/or reduce influence of heat generated by the electronic components included in the electronic device 101. However, the position where the first sensor 221 is disposed is not limited to the above-described example.

In an embodiment, the electronic device 101 may include a second sensor (hereafter, referred to as a 'second sensor') for detecting the position of the second housing 204 (or the movement of the second housing 204). In an embodiment, the second sensor may include a hall sensor. For example, the electronic device 101 may include hall sensor ICs 223 and 225 and a magnet (or a magnetic material) (not shown). According to an embodiment, the hall sensor ICs 223 and 225 may be disposed in the first housing 210, and the magnet may be disposed in the second housing 204.

In an embodiment, the magnet included in the second housing 204 may be moved according to the movement of the second housing 204. In an embodiment, the magnet disposed in the second housing 204 may be positioned at a position overlapping the first hall sensor IC 223 if the second housing 204 is positioned at the first position P1 1 or may be positioned within a designated distance (e.g., a distance in which the hall sensor may detect the magnet included in the second housing 204) from the first hall sensor IC 223. In an embodiment, the magnet included in the second housing 204 may be positioned at a position overlapping the second hall sensor IC 225 if the second housing 204 is positioned at the second position P2 or may be positioned within a designated distance (e.g., a distance in which the hall sensor may detect the magnet included in the second housing 204) from the second hall sensor IC 225.

In FIG. 2A and FIG. 2B, it is illustrated that the two hall sensor ICs 223 and 225 are disposed in the first housing 210, but it is not limited thereto.

In an embodiment, one hall sensor IC for detecting the position of the magnet disposed in the second housing 204 may be disposed in the first housing 210, with the second housing 204 at a position between the first position P1 and the second position P2 including the first position P1 and the second position P2. For example, if one hall sensor IC is disposed in the first housing 210, a range (or a detection range) for detecting the magnet of the one hall sensor IC may be wider than a range of the two hall sensor ICs 223 and 225 for detecting the magnet.

In an embodiment, three or more hall sensor ICs, allowing the second housing 204 to detect the position of the magnet disposed in the second housing 204, may be disposed in the first housing 210, at a position between the first position P1 and the second position P2 including the first position P1 and the second position P2. For example, at least one hall sensor IC may be additionally disposed on a virtual line formed between the first hall sensor IC 223 and the second hall sensor IC 225.

In an embodiment, if three or more hall sensor ICs are disposed in the first housing 210, they may detect the position of the second housing 204 (or the magnet disposed in the second housing 204) positioned between the first position P1 and the second position P2. For example, if two or more hall sensor ICs are disposed in the first housing 210 and the second housing 204 positioned at the first position P1 or the second position P2 may be detected, and three or more hall sensor ICs are disposed in the first housing 210, the position (or coordinates) of the second housing 204 positioned between the first position P1 and the second position P2 as well as the first position P1 or the second position P2 may be detected.

In FIG. 2A and FIG. 2B, the hall sensor is illustrated as the second sensor for detecting the position of the second housing 204 (or the movement of the second housing 204), but it is not limited thereto. For example, the second sensor may include any sensor (e.g., an infrared sensor, an IR sensor, an acceleration sensor, etc.) for detecting the position of the second housing 204 (or the movement of the second housing 204).

Although not depicted in FIG. 2A and FIG. 2B, in an embodiment, the electronic device 101 may include a processor 120 which controls the operation of moving the second housing 204 in the first direction L1 or the second direction L2.

In an embodiment, if executing a function related to the optical module 205 (e.g., if executing a function for video call, selfie shooting, iris recognition or face recognition), the processor 120 may control to protrude the second housing 204 out of the first housing 210. For example, the processor 120 may control a driving unit (not shown) to protrude the second housing 204 from the first housing 210, if the function related to the optical module 205 is executed.

In an embodiment, the processor 120 may control to accommodate the second housing 204 into the first housing 210, if the function related to the optical module 205 is terminated (or completed). For example, if the function related to the optical module 205 is ended, the processor 120 may control the driving unit to accommodate the second housing 204 in the first housing 210.

Embodiments related to the operation of the processor 120 for moving the second housing 204 in the first direction L1 or the second direction L2 shall be described in greater detail below.

Although not depicted in FIG. 2A and FIG. 2B, the electronic device 101 may further include at least some of the configurations of the electronic device 101 shown in FIG. 1, or may omit some of the configurations shown in FIG. 2A and FIG. 2B.

Figure 3A:
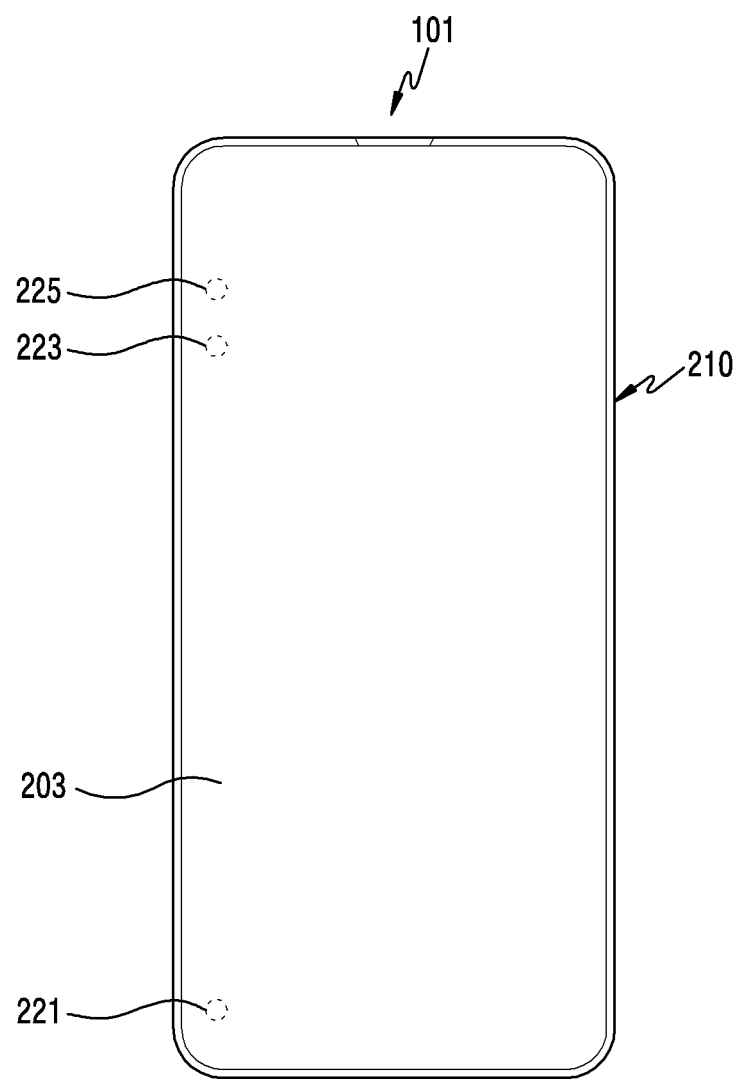
FIG. 3A is a diagram illustrating a front view of an electronic device in which a second housing is accommodated in a first housing, according to various embodiments.

FIG. 3A is a diagram illustrating a front view of an electronic device 101 in which a second housing 204 is accommodated in a first housing 210, according to various embodiments.

Figure 3B:
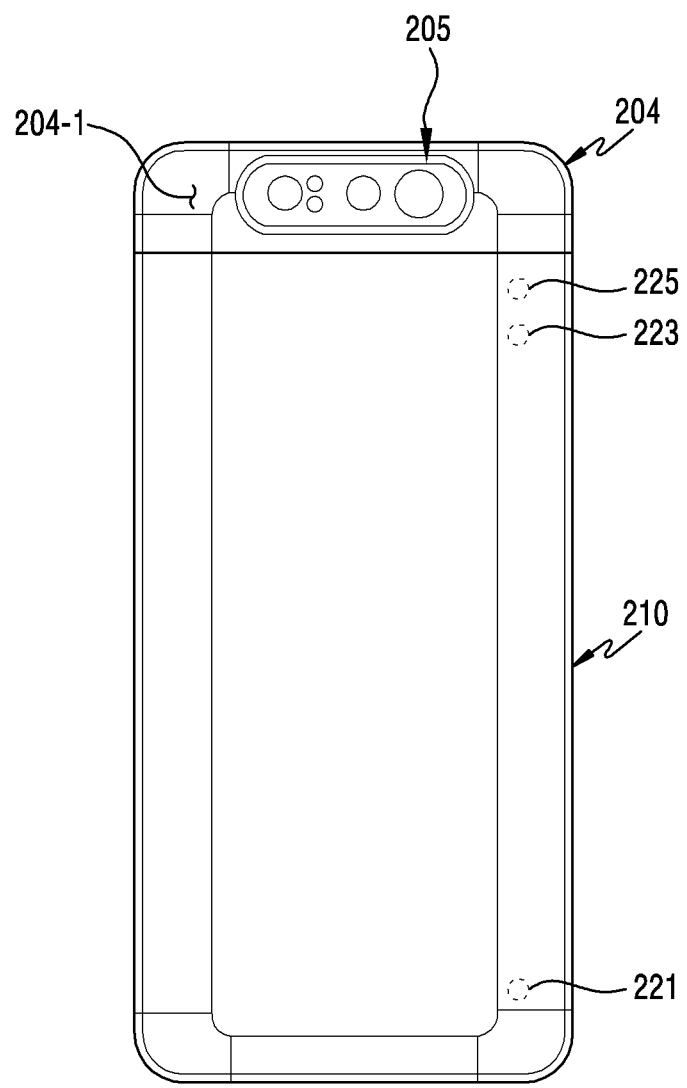
FIG. 3B is a diagram illustrating a rear view of an electronic device in which a second housing is accommodated in a first housing, according to various embodiments.

FIG. 3B is a diagram illustrating a rear view of the electronic device 101 in which the second housing 204 is accommodated in the first housing 210, according to various embodiments.

Referring to FIG. 3A and FIG. 3B, in FIG. 3A, according to an embodiment, with the second housing 204 accommodated in the first housing 210, the second housing 204 or the optical module 205 may be at least in part hidden by the display 203, when viewing the first surface 210A of the first housing 210.

In FIG. 3B, according to an embodiment, with the second housing 204 accommodated in the first housing 210, at least part of the second housing 204 or the optical module 205 may be exposed to outside, when viewing a first surface 204-1 of the second housing 204. For example, with the second housing 204 accommodated in the first housing 210, the first surface 204-1 of the second housing 204 and at least one electronic component included in the optical module 205 may be exposed to outside, when viewing the first surface 204-1 of the second housing 204.

However, the exposed form of the second housing 204 according to the embodiment of the present document is not limited to the above-described form, and it may be configured in a form (not shown) fully accommodated in the first housing according to an embodiment.

Figure 4A:
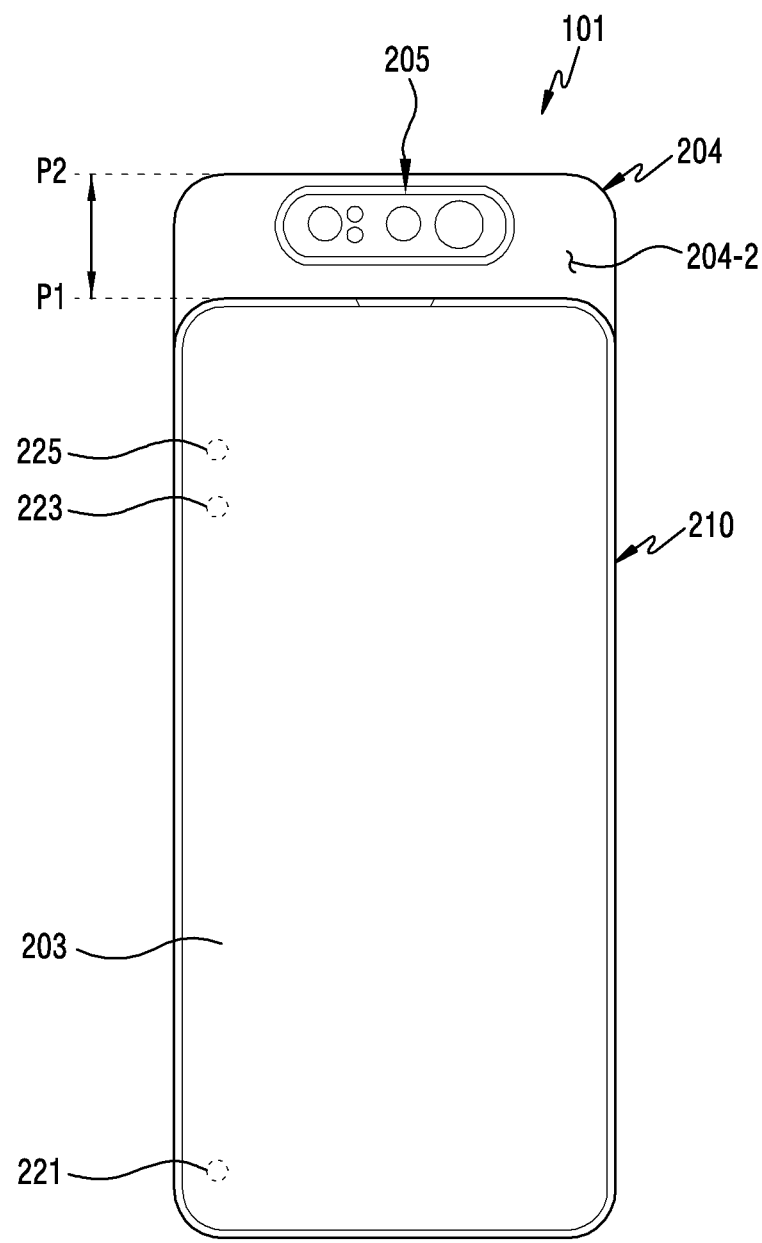
FIG. 4A is diagram illustrating a front view of an electronic device in which a second housing protrudes from a first housing, according to various embodiments.

FIG. 4A is a diagram illustrating a front view of an electronic device 101 in which a second housing 204 protrudes from a first housing 210, according to various embodiments.

Figure 4B:
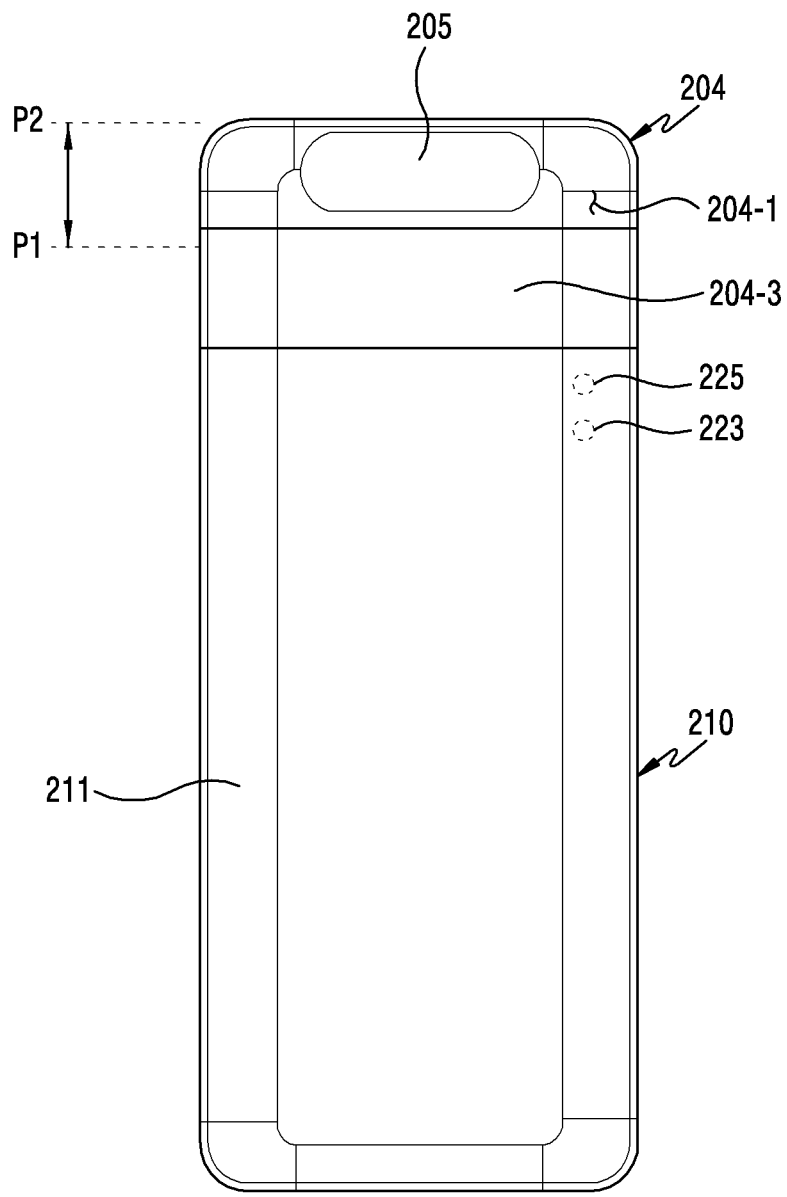
FIG. 4B is a diagram illustrating a rear view of an electronic device in which a second housing protrudes from a first housing, according to various embodiments.

FIG. 4B is a diagram illustrating a rear view of the electronic device 101 in which the second housing 204 protrudes from the first housing 210, according to various embodiments.

Referring to FIG. 4A and FIG. 4B, if the second housing 204 moves (or slides and moves) to be positioned at the second position P2, at least part of the second housing 204 or the optical module 205 may protrude toward one side of the first housing 210. For example, as shown in FIG. 4A, the second housing 204 may, at the second position P2, protrude toward one side of the first housing 210, to expose at least in part a second surface 204-2 of the second housing 204 to the outside.

In an embodiment, since the optical module 205 rotates while the second housing 204 moves from the first position P1 to the second position P2, the optical module 205 with the second housing 204 positioned at the second position P2 may be rotated to face the same direction as the direction which the first surface (e.g., 210A in FIG. 2A) of the first housing 210 faces (or the direction in which the display 203 outputs the screen), as shown in FIG. 4A. In an embodiment, with the second housing 204 protruding out of the first housing and positioned at the second position P2, the first surface 204-1 of the second housing 204, and at least part of a third surface 204-3 of the second housing 204 which forms a step with the first surface 204-1 may be exposed to the outside, as shown in FIG. 4B.

Figure 5:
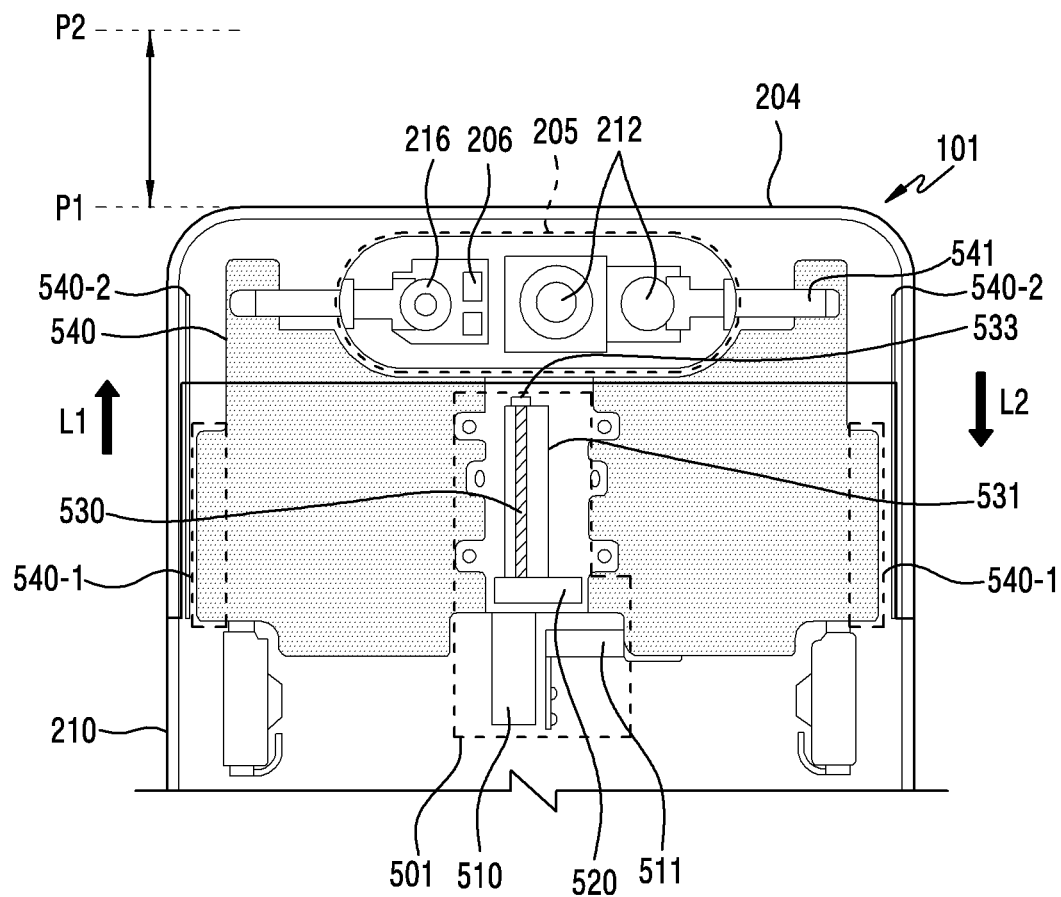
FIG. 5 is a diagram illustrating part of an electronic device, according to various embodiments.

FIG. 5 is a diagram illustrating part of an electronic device 101, according to various embodiments.

Referring to FIG. 5, in an embodiment, FIG. 5 may be the plan view projectively showing the part of the electronic device 101, if the first housing 210 is positioned at the first position P1. In an embodiment, FIG. 5 may be a diagram illustrating an example method of moving the second housing 204 from the first position P1 to the second position P2 or from the second position P2 to the first position P1.

In an embodiment, the second housing 204 may move from the first position P1 to the second position P2 or from the second position P2 to the first position P11 by a driving unit 501 disposed in the first housing 210.

In an embodiment, the driving unit 501 may be disposed in the first housing 210, and may include a driving motor 510 (e.g., a step motor), a frame nut 520, a driving frame 531, a driving shaft 530, a bearing 533, and a flexible printed circuit board (FPCB) 511. Yet, the configuration included by the driving unit 501 is not limited to the above configuration.

In an embodiment, the driving motor 510 may receive power from the FPCB 511, and rotate the driving shaft 530, using the applied power.

Hereafter, rotational force generated by the driving operation of the driving motor 510 may be referred to as 'torque', and a frequency at which the driving motor 510 drives (or a rotation shaft of the driving motor 510 rotates) may be referred to as a 'driving frequency'.

In an embodiment, if a constant power (or rate of doing work) is applied to the driving motor 510, the torque may reduce if the driving frequency is increased, and the torque may increase if the driving frequency is decreased. For example, if the constant power is applied to the driving motor 510, the driving frequency and the torque may be in linear or nonlinear inverse proportion.

In an embodiment, the driving shaft 530 may be mounted on the drive frame 531, and may rotate by receiving the torque from the motor. In an embodiment, the driving shaft 530 may be disposed in parallel to the first direction L1 and the second direction L2, and may rotate while being screwed with the frame nut 520.

In an embodiment, the bearing 533 may include an inner race, a roller, and an outer race. In an embodiment, the inner race of the bearing 533 may be coupled with the driving shaft 530 (or fixed to the driving shaft), and the outer race of the bearing 533 may be coupled with the drive frame 531 (or fixed to a drive housing). In an embodiment, the roller of the bearing 533 may be rotated according to the rotation of the driving shaft 530, and may be formed in a ball shape. Yet, the form in which the roller of the bearing 533 is formed is not limited to the ball shape.

In an embodiment, the frame nut 520 may be fixed (or fastened) to a slide member while being screwed with the driving shaft 530, and may linearly move in the first direction L1 or the second direction L2 according to the rotation of the driving shaft 530. As the frame nut 520 moves linearly, a slide member 540 coupled with the frame nut 520 (or the second housing 204 fixed with the slide member 540) may linearly move in the first direction L1 or the second direction L2.

In an embodiment, the slide member 540 may be fixed (or mounted) to the second housing 204, and coupled with the frame nut 520. In an embodiment, the slide member 540 may include guide ribs 540-1 formed at both of side ends. The guide ribs 540-1 may contact the first housing 210 to allow the slide member 540 to move in the first direction L1 or the second direction L2. For example, the guide ribs 540-1, which are contacting a guide structure (not shown) mounted on the first housing 210, may move linearly or nonlinearly in the first direction L1 or the second direction L2.

In an embodiment, the optical module 205 may include a rotating shaft 541 for rotating at least one electronic component and the optical module 205. In an embodiment, the optical module 205 may rotate according to the rotation of the rotating shaft 541, while the second housing 204 moves in some of an interval between the first position P1 and the second position P2.

In an embodiment, if the optical module 205 is disposed to face the front surface of the first housing 210, it may not include the rotating shaft 541. In this case, in an embodiment, if the optical module 205 moves to the second position P2, a subject may be captured using the exposed optical module 205.

Figure 6A:
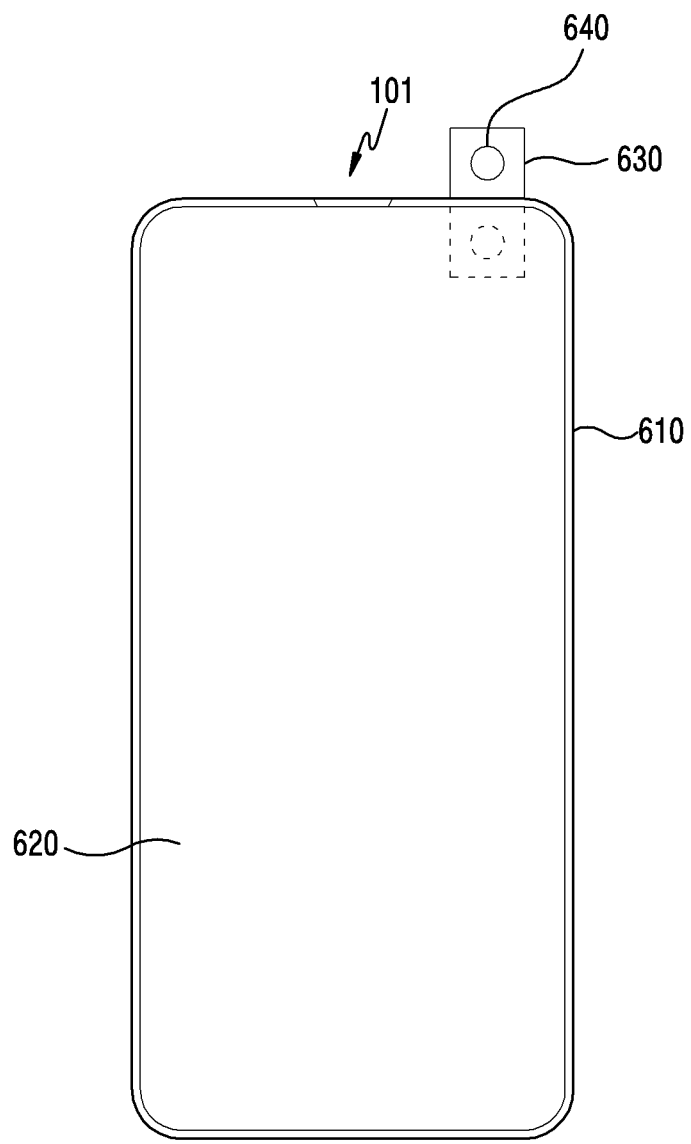
FIG. 6A is a diagram illustrating a front surface of an electronic device, according to various embodiments.

FIG. 6A is a diagram illustrating a front surface of an electronic device 101, according to various embodiments.

Figure 6B:
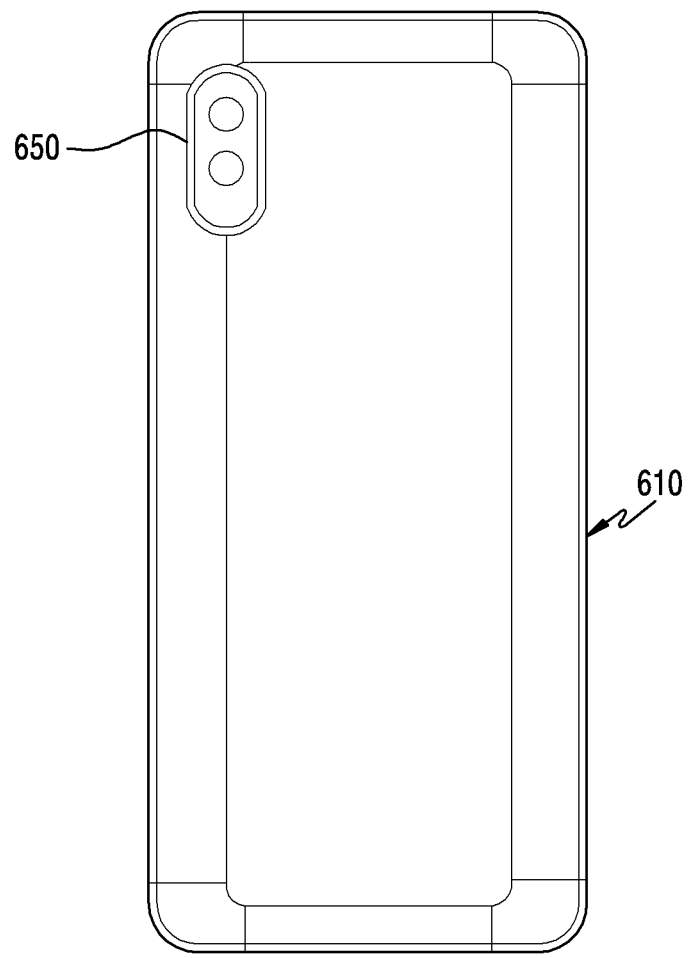
FIG. 6B is a diagram illustrating a rear surface of an electronic device, according to various embodiments.

FIG. 6B is a diagram illustrating a rear surface of the electronic device 101, according to various embodiments.

Referring to FIG. 6A and FIG. 6B, in an embodiment, the electronic device 101 may include a first camera module 640 and a second camera module 650.

In an embodiment, the first camera module 640 may be accommodated (or inserted) in the first housing 610 or protruded (or withdrawn) from the first housing 610. For example, the first camera module 640 may protrude from the first housing 610 to the outside, if a function related to the first camera module 640 is executed in the accommodated state or by a user's input.

In an embodiment, the first camera module 640 may be mounted (or fixed) to the second housing 630 (or a second body). In an embodiment, the first camera module 640 may be a camera module (e.g., a front camera) fixed to face a direction which the display 620 faces to capture a subject positioned in the direction which the display 620 faces (or in front of the electronic device 101).

In an embodiment, a second housing 630 in which the first camera module 640 is mounted may be accommodated in the first housing 630, if the function related to the first camera module 640 is ended (or completed).

In an embodiment, if embodiments of the operation for protruding or accommodating the first camera module 640 (or the second housing 630) from or in the first housing 610 are identical or similar to at least in part the embodiments explained in FIG. 1A through FIG. 5B, their detailed descriptions may not be repeated here.

In an embodiment, the second camera module 650 may be disposed on the rear surface of the electronic device 101. In an embodiment, the second camera module 650 may be mounted (or fixed) on the rear surface of the electronic device 101.

In an embodiment, the second camera module 650 may be a camera module (e.g., a rear camera) for capturing a subject positioned in a direction opposite (or the rear surface of the electronic device 101) to the direction which the display 620 faces.

In an embodiment, due to various factors, the operation of the second housing 204 (or the second housing 630) for protruding from the first housing 210 (or the first housing 610) or being accommodated in the first housing 210 may not be normally performed. For example, while the second housing 204 is moving, it may be stopped between the first position P1 and the second position P2, due to various factors (e.g., dust, temperature, etc.). If the second housing 204 is stopped between the first position P1 and the second position P2, the optical module 205 coupled to the second housing 204 may not normally function.

In an embodiment, if the temperature of the electronic device 101 is a low temperature (e.g., about −11 degrees (° C.) or less), the torque of the driving unit may be reduced (or decreased) and thus the second housing 204 may not protrude from the first housing 210 and move to a designated position (e.g., the second position P2), or the operation for being received in the first housing 210 may not be normally performed. For example, if the temperature of the electronic device 101 is a low temperature state, clearance (or a space, or a gap) of the bearing 533 may be reduced and shaft loss may occur in the driving shaft 530. If the temperature of the electronic device 101 reaches the low temperature, the space between the roller and the outer race of the bearing 533 is reduced, and friction force by the contact of the roller and the outer race of the bearing 533 may be increased by the space reduction between the roller and the outer race of the bearing 533. As another example, if the temperature of the electronic device 101 is the low temperature state, the torque of the driving unit may be reduced (or lowered) due to viscosity increase of grease spread to the driving shaft 530 and the shaft of the drive motor 510.

In an embodiment, if the temperature of the electronic device 101 is a low temperature, a space between guide ribs 541-1 of the slide member 541 and a guide structure (not shown) mounted on the first housing 210 may be reduced, thus increasing friction force between the guide ribs 541-1 and the guide structure 540-2 mounted on the first housing 210. If the friction force between the guide ribs 541-1 and the guide structure mounted on the first housing 210 increases, the operation of protruding or accommodating the second housing 204 from the first housing 210 or into the first housing 210 may not be normally performed.

In an embodiment, if a foreign substance is introduced (or a foreign substance is caught) into the components (e.g., a mechanical structure) of the electronic device 101, the operation of protruding or accommodating the second housing 204 from the first housing 210 or into the first housing 210 may not be normally performed.

However, the reasons why the operation of protruding or accommodating the second housing 204 from the first housing 210 or into the first housing 210 is not normally performed are not limited to the above-described examples.

Hereafter, referring to FIG. 7 through FIG. 17, regardless of (or by minimizing and/or reducing) the influence of the aforementioned factors, embodiments of a method for normally performing the operation of protruding or accommodating the second housing 204 from the first housing 210 or into the first housing 210 will be described in detail.

An electronic device according to example embodiments of the present disclosure may include: a first housing, a second housing coupled to the first housing and configured to move in a first direction from a first position to a second position or in a second direction opposite the first direction between the first position at least in part accommodated in the first housing and the second position protruding from the first housing, a driving unit comprising a driving motor configured to drive the second housing in the first direction or the second direction, a first sensor configured to detect a position of the second housing, at least one processor operably coupled with the driving unit and the first sensor, and a memory operably coupled with the at least one processor, wherein the memory may store instructions which, when executed, cause the at least one processor to: detect an input for moving the second housing in the first direction, control the driving unit to drive the driving unit for a first time to move the second housing in the first direction, identify whether the second housing is positioned at the second position through the first sensor, in response to identifying that the second housing is not positioned at the second position, control the driving unit to drive the driving unit for a second time to move the second housing in the second direction, and control the driving unit to drive the driving unit for the second time, and control the driving unit to drive the driving unit for a third time to move the second housing in the first direction.

In an example embodiment, the first sensor may include a hall sensor disposed in the first housing, the hall sensor including a first hall sensor integrated circuit (IC) and a second hall sensor IC, the first hall sensor IC may be configured to detect that the second housing is at the first position by detecting a magnet disposed in the first housing, and the second hall sensor IC may be configured to detect that the second housing is at the second position by detecting the magnet.

In an example embodiment, the instructions, when executed, may cause the at least one processor to: in response to identifying that the second housing is not positioned at the second position, control the driving unit to drive the driving unit for the second time to move the second housing in the second direction.

In an example embodiment, the instructions, when executed, may cause the at least one processor to make a driving frequency of the driving unit driven for the designated second time less than a driving frequency of the driving unit driven for the first time.

In an example embodiment, the instructions, when executed, may cause the at least one processor to: control the driving unit to drive the driving unit for the second time, and control the driving unit to drive the driving unit for a fourth time to move the second housing in the first direction, and control the driving unit to drive the driving unit for the fourth time, and control the driving unit to drive the driving unit for a fifth time to move the second housing in the second direction, before controlling the driving unit to drive the driving unit for the third time to move the second housing in the first direction.

In an example embodiment, the instructions, when executed, may cause the at least one processor to designate the second time, the fourth time, and the fifth time to be the same.

In an example embodiment, the instructions, when executed, may cause the at least one processor to designate the second time, the fourth time, and the fifth time such that the fourth time is longer than the second time, and the fifth time is shorter than the second time.

In an example embodiment, the instructions, when executed, may cause the at least one processor to designate the third time to be the same as the first time.

In an example embodiment, the instructions, when executed, may cause the at least one processor to: in response to identifying that the second housing is not positioned at the second position, control the driving unit to drive the driving unit to move the second housing by a specified distance in the second direction.

In an example embodiment, the instructions, when executed, may cause the at least one processor to: based on the driving unit driving to move the second housing by the specified distance in the second direction, designate a driving frequency of the driving unit by considering a friction force applied to the second housing between a position of the second housing before moving in the second direction and a position to be moved by the designated distance.

In an example embodiment, the electronic device may further include: a second sensor configured to detect a temperature of the electronic device, and the instructions, when executed, may cause the at least one processor to: obtain information of the temperature from the second sensor, and control the driving unit to drive the driving unit at a driving frequency corresponding to the temperature for the second time to move the second housing in the second direction.

An electronic device according to example embodiments of the present disclosure, may include: a first housing, a second housing coupled to the first housing, and configured to move in a first direction from a first position to a second position or in a second direction opposite the first direction between the first position at least in part accommodated in the first housing and the second position protruding from the first housing, a driving unit comprising a driving motor configured to move the second housing in the first direction or the second direction, a first sensor configured to detect a temperature of the electronic device, a second sensor configured to detect a position of the second housing, at least one processor operably coupled with the driving unit, the first sensor, and the second sensor, and a memory operably coupled with the at least one processor, wherein the memory may store instructions which, when executed, cause the at least one processor to: detect an input for moving the second housing in the first direction, obtain information of the temperature of the electronic device through the first sensor, based on the temperature being a first specified temperature, control the driving unit to drive the driving unit for a first time at a first driving frequency to move the second housing in the first direction, identify whether the second housing is positioned at the second position, through the first sensor, in response to identifying that the second housing is not positioned at the second position, control the driving unit to drive the driving unit for a second time at a second driving frequency to move the second housing in the second direction, and control the driving unit to drive the driving unit for the second time, and control the driving unit to drive the driving unit for a third time at a third driving frequency to move the second housing in the first direction, and based on the temperature being a second specified temperature, control the driving unit to drive the driving unit for the first time at a fourth driving frequency to move the second housing in the first direction, identify whether the second housing is positioned at the second position, through the first sensor, in response to identifying that the second housing is not positioned at the second position, control the driving unit to drive the driving unit for the second time at a fifth driving frequency to move the second housing in the second direction, and control the driving unit to drive the driving unit for the second time, and control the driving unit to drive the driving unit for the third time at a sixth driving frequency to move the second housing in the first direction.

In an example embodiment, the instructions, when executed, may cause the at least one processor to: identify the temperature, and identify the driving frequency of the driving unit corresponding to the temperature.

In an example embodiment, the instructions, when executed, may cause the at least one processor to: based on the first temperature being higher than the second temperature, the first driving frequency, the second driving frequency, and the third driving frequency are designated to be higher than the fourth driving frequency, the fifth driving frequency, and the sixth driving frequency, respectively.

In an example embodiment, a torque of the driving unit driven by the fourth driving frequency, the fifth driving frequency, and the sixth driving frequency each may be greater than a torque of the driving unit driven by the first driving frequency, the second driving frequency, and the third driving frequency each.

In an example embodiment, the electronic device may further include: an optical module including a lens coupled to the second housing, and configured to rotate while the second housing moves in the first direction.

In an example embodiment, the input for moving the second housing in the first direction may include an input for executing a function related to the optical module.

An electronic device according to example embodiments of the present disclosure may include, a first housing, a second housing coupled to the first housing, and configured to move in a first direction from a first position to a second position or in a second direction opposite the first direction between the first position at least in part accommodated in the first housing and the second position protruding from the first housing, a driving unit comprising a driving motor configured to move the second housing in the first direction or the second direction, at least one position sensor configured to detect a position of the second housing, at least one processor operably coupled with the driving unit and the at least one position sensor, and a memory operably coupled with the at least one processor, wherein the memory may store instructions which, when executed, cause the at least one processor to: detect an input for moving the second housing in the first direction, control the driving unit to drive the driving unit to move the second housing in the first direction, based on the position of the second housing being a first position, control the driving unit to drive at a first driving frequency, and based on the position of the second housing being a second position, control the driving unit to drive at a second driving frequency.

In an example embodiment, the instructions, when executed, may cause the at least one processor to: in response to identifying that the second housing is maintained at the first position over a designated time, control the driving unit to drive the driving unit at the first driving frequency to move the second housing by a first specified distance in the second direction, and based on the second housing being moved by the first specified distance, control the driving unit to drive the driving unit to move the second housing in the first direction.

In an example embodiment, the instructions, when executed, may cause the at least one processor to: in response to identifying that the second housing is maintained at the second position over a designated time, control the driving unit to drive the driving unit at the second driving frequency to move the second housing by a second specified distance in the second direction, and based on the second housing being moved by the second designated distance, control the driving unit to drive the driving unit to move the second housing in the first direction.

Figure 7:
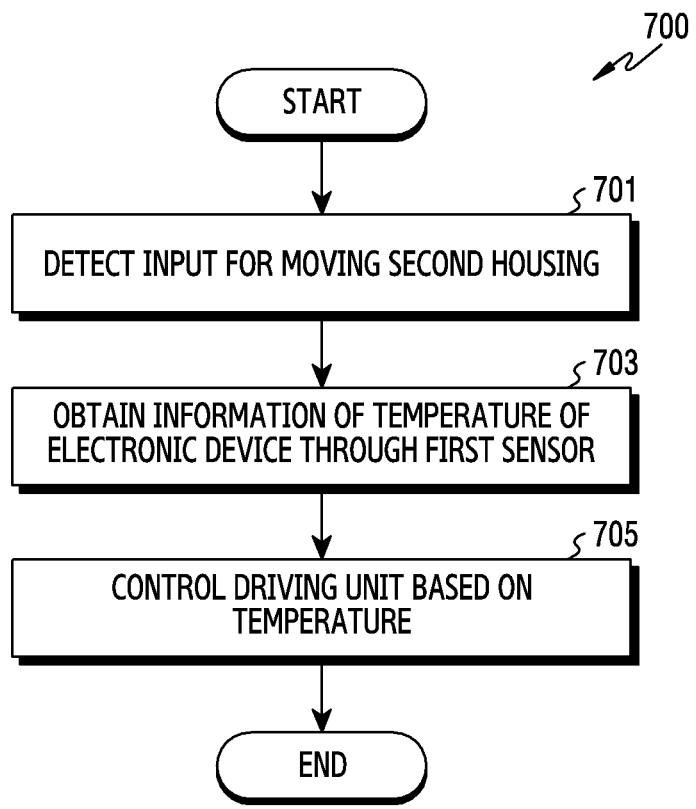
FIG. 7 is a flowchart illustrating an example method for moving part of an electronic device, based on a temperature of the electronic device, according to various embodiments.

FIG. 7 is a flowchart 700 illustrating an example method of moving part of an electronic device 101, based on a temperature of the electronic device 101, according to various embodiments.

Figure 8:
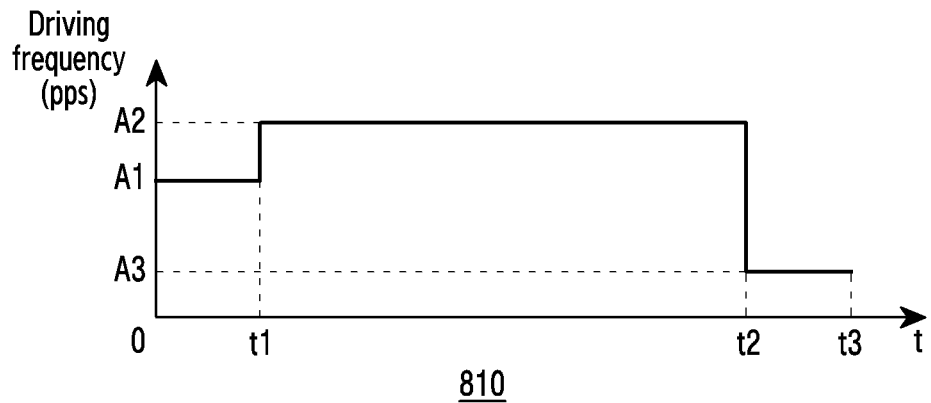
FIG. 8 is a diagram illustrating an example method for moving part of an electronic device, based on a temperature of the electronic device, according to various embodiments.
Figure 8:
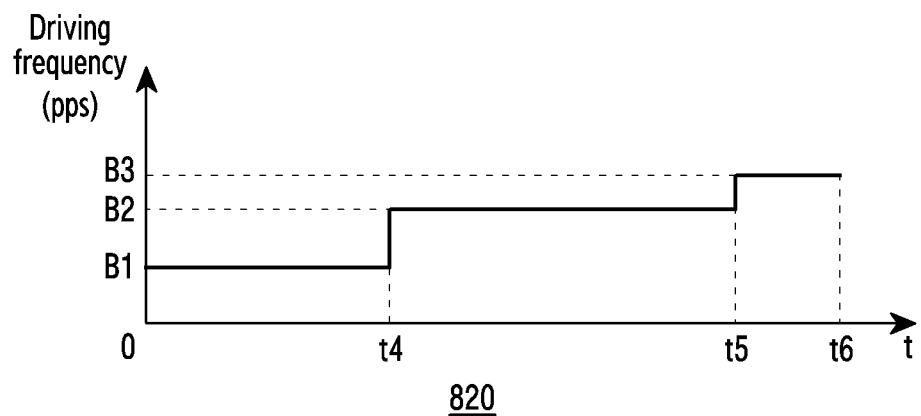
Figure 8:

FIG. 8 is a diagram illustrating an example method of moving part of an electronic device 101, based on a temperature of the electronic device 101, according to various embodiments.

Referring to FIG. 7 and FIG. 8, in operation 701 according to an embodiment, the processor 120 may detect an input for moving the second housing 204 in the first direction L1.

In an embodiment, the input for moving the second housing 204 in the first direction L1 may include an input for executing a function related to the optical module 205 (or an electronic component included in the optical module 205) explained in FIG. 2A through FIG. 6B, which is input with the second housing 204 accommodated (or withdrawn) in the first housing 210.

In an embodiment, the input for moving the second housing 204 in the second direction L2 may include an input for terminating the execution of the function related to the optical module 205, which is input with the second housing 204 protruded out of the second housing 210. The electronic device may identify the temperature and control differently according to the temperature even in the operation for terminating the use of the optical module, identify if a problem occurs, and perform an operation for controlling the driving unit 501 to move the second housing 204 to a designated position.

In an embodiment, the input for executing the function related to the optical module 205 may include an input for capturing a subject positioned in a direction which the display 203 faces. For example, the input for executing the function related to the optical module 205 may include an input for taking a selfie. As another example, the input for executing the function related to the optical module 205 may include an input for conducting a video call function. As yet another example, the input for executing the function related to the optical module 205 may include an input for executing a function for recognizing a user's iris or a user's visage (or face).

In an embodiment, the input for moving the second housing 204 in the first direction L1 may include the input for executing the function related to the camera module 540 (e.g., a front camera) explained in FIG. 6, which is input with the second housing 204 (or the slide body) accommodated (or withdrawn) in the first housing 210. For example, the input for executing the function related to the camera module may include at least one of the input for taking the selfie, the input for performing the video call function, or the function for recognizing the user's iris (or the user's visage).

The input for moving the second housing 204 in the first direction L1 is not limited thereto. For example, the input for moving the second housing 204 in the first direction L1 may include, if the optical module 205 includes at least one of a luminance sensor or a proximity sensor, an input for conducting a function related to at least one of the luminance sensor or the proximity sensor.

In operation 703 according to an embodiment, the processor 120 may obtain information of the temperature of the electronic device 101 through the first sensor 221 (e.g., a temperature sensor or a thermistor) for detecting the temperature of the electronic device 101.

In an embodiment, the first sensor 221 may include a thermistor (or a battery thermistor) disposed in a battery of the electronic device 101.

In an embodiment, the first sensor 221 may detect (or sense) the temperature inside the electronic device 101. However, it is not limited thereto. For example, the first sensor 221 may detect the temperature around the electronic device 101.

In an embodiment, the processor 120 may activate the first sensor 221, in response to detecting the input for moving the second housing 204 in the first direction L1. However, it is not limited thereto. For example, the first sensor 221 may be activated before detecting the input for moving the second housing 204 in the first direction L1, and the processor 120 may obtain from the activated first sensor 221 the temperature information of the electronic device 101 (e.g., a temperature detected immediately after detecting the input for moving the second housing 204 in the first direction L1).

In operation 705 according to an embodiment, the processor 120 may control the driving unit 501 to move the second housing 204 in the first direction L1, based on the temperature of the electronic device 101.

In an embodiment, the processor 120 may identify the temperature of the electronic device 101, in response to obtaining the temperature information of the electronic device 101 from the first sensor 221.

In an embodiment, the processor 120 may identify a driving frequency of the driving motor 510 corresponding to the temperature of the electronic device 101.

In an embodiment, the driving frequency of the driving motor 510 may be differently designated according to the temperature of the electronic device 101. For example, a first driving frequency of the driving motor 510 may be designated for a first temperature of the electronic device 101, and a second driving frequency different from the first driving frequency may be designated for a second temperature which is different from the first temperature. However, it is not limited thereto.

According to an embodiment, a processor (e.g., a motor controller) for controlling the driving unit 501 may be separately disposed. In this case, to quickly perform the motor control by temperature, if the separate motor controller directly connected to the driving unit 501 and the temperature sensor operates the driving unit 501, it may be designed to identify the temperature and to control the frequency of the driving unit 501.

In FIG. 8, in an embodiment, if the temperature of the electronic device 101 is identified as a room temperature (e.g., about 20° C.), a graph 810 may represent the designated frequency of the driving motor 510.

In an embodiment, in the graph 810, if a time t=0 may indicate a time at which the second housing 204 is positioned at the first position P1, and a time t=t3 may indicate a time at which the second housing 204 is positioned at the second position.

In an embodiment, in the graph 810, in a time interval from the time t=0 to the time t=t1, the driving frequency of the driving motor 510 may be A1 (e.g., about 2343 pulse per second (pps)), and t1 may be about 30 ms. In the graphs 810 and 820, about 20 pps may correspond to one rotation of the driving shaft of the driving motor 510.

As mentioned above, in an embodiment, if a constant power (or rate of doing work) is applied to the driving motor 510, the torque may be decreased if the driving frequency is increased, and the torque may be increased if the driving frequency is reduced. For example, if the constant power is applied to the driving motor 510, the driving frequency and the torque may be in linear or nonlinear inverse proportion. Hereafter, the increase of the driving frequency may indicate the decrease of the torque, and the decrease of the driving frequency may indicate the increase of torque.

In an embodiment, in the graph 810, in the time interval from the time t=t1 to the time t=t2, the driving frequency of the driving motor 510 may be A2 (e.g., about 3125 pps), and the time interval from the time t=t1 to the time t=t2 may be about 830 ms.

In an embodiment, in the graph 810, in the time interval from the time t=t2 to the time t=t3, the driving frequency of the drive motor 510 may be A3 which is lower than A1, and the time interval from the time t=t2 to the time t=t3 may be about 50 ms.

In an embodiment, as shown in the graph 810, the driving frequency designated in the time interval from the time t=0 to the time t=t1 and the time interval from the time t=t2 to the time t=t3 may be lower than the driving frequency designated in the time interval from the time t=t1 to the time t=t2. For example, the driving frequency may be designated as shown in the graph 810, by considering that the friction force (e.g., a friction force or a static friction force between the first housing 210 and the second housing 204) generating in the time interval from the time t=0 at which the second housing 204 starts moving in the first direction L1 to the time t=t1 and the time interval from the time t=t2 to the time t=t3 at which the second housing 204 is positioned at the second position P2 is greater than the friction force (e.g., a friction force or a kinetic friction force between the first housing 210 and the second housing 204) generating in the time interval from the time t=t1 to the time t=t2. As another example, the driving frequency may be designated as shown in the graph 810, by considering that the influence of the mechanical structure generating in the time interval from the time t=0 at which the second housing 204 starts moving in the first direction L1 to the time t=t1 and the time interval from the time t=t2 to the time t=t3 at which the second housing 204 is positioned at the second position P2 is greater than the influence of the mechanical structure generating in the time interval from the time t=t1 to the time t=t2.

The driving frequency shown in the graph 810 is merely an example, and is not limited thereto. According to an embodiment, the driving frequency pps may be also configured to linearly increase from A1 to A2 between the time t=0 and the time t=t1. It may be configured to substantially increase the driving frequency, and the magnitude change of the driving frequency is not limited to the shown graph, and may be adjusted according to various factors to consider such as an electronic device status, a battery status, an application importance (if essential biometric authentication is required even at a low temperature).

In FIG. 8, in an embodiment, if the temperature of the electronic device 101 is identified as a low temperature (e.g., about −11° C.), the graph 820 may represent the designated frequency of the driving motor 510. In an embodiment, in the graph 820, the time t=0 may indicate a time at which the second housing 204 is positioned at the first position P1, and a time t=t6 may indicate a time at which the second housing 204 is positioned at the second position.

In an embodiment, in the graph 820, for a time interval from the time t=0 to the time t=t4, the driving frequency of the driving motor 510 may be B1 (e.g., about 781 pps), and the time interval from the time t=0 to the time t=t4 may be about 1000 ms.

In an embodiment, in the graph 820, for a time interval from the time t=t4 to a time t=t5, the driving frequency of the driving motor 510 may be B2 (e.g., about 1562 pps), and the time interval from the time t=t4 to the time t=t5 may be about 1050 ms.

In an embodiment, in the graph 820, for a time interval from the time t=t5 to the time t=t6, the driving frequency of the drive motor 510 may be B3 higher than B2, and the time interval from the time t=t5 to the time t=t6 may be about 75 ms.

In an embodiment, as shown in the graph 820, the driving frequency designated in the time interval from the time t=0 to the time t=t4 may be lower than the driving frequency designated in the time interval from the time t=t4 to the time t=t5. For example, the driving frequency may be designated as shown in the graph 820, by considering that a friction force (e.g., a friction force or a static friction force between the first housing 210 and the second housing 204) generating in the time interval from the time t=0 at which the second housing 204 starts moving in the first direction L1 to the time t=t4 is greater than a friction force (e.g., a friction force or a kinetic friction force between the first housing 210 and the second housing 204) generating in the time interval from the time t=t4 to the time t=t5. The driving frequency designated in the time interval from the time t=t5 to the time t=t6 may be higher than the driving frequency designated in the time interval from the time t=t4 to the time t=t5. For example, the driving frequency designated in the time interval from the time t=t5 to the time t=t6 may be higher than the driving frequency designated in the time interval from the time t=t4 to the time t=t5, by considering that a possible malfunction occurring in the electronic device 101 or the influence of the mechanical structure.

However, the driving frequency shown in the graph 820 is merely an example, and is not limited thereto.

In an embodiment, comparing the graph 810 and the graph 820, if the temperature of the electronic device 101 is the room temperature, the driving frequency of the driving motor 510 may be designated higher than the low temperature. Designating the driving frequency of the driving motor 510 higher than the low temperature if the temperature of the electronic device 101 is the room temperature may refer, for example, to the driving frequency of the drive motor 510 being designated to raise the torque of the driving motor 510 if the temperature of the electronic device 101 is the low temperature, compared to the high temperature.

In an embodiment, the frequency of the driving motor 510 which differs depending on the temperature of the electronic device 101 may be stored in the memory 130 to correspond (or to map) to the temperature of the electronic device 101.

In an embodiment, the frequency of the driving motor 510 may be differently designated according to a temperature range of the electronic device 101. For example, a first driving frequency of the driving motor 510 may be designated in a first temperature range of the electronic device 101, and a second driving frequency different from the first driving frequency may be designated in a second temperature range which is different from the first temperature range. For example, the graph 810 may be the graph of the driving frequency corresponding to the first temperature range (e.g., 20° C. or more), the graph 820 may be the graph of the driving frequency corresponding to the second temperature range (e.g., −11° C. or less), and the graph 830 may be the graph of the driving frequency corresponding to a third temperature range (e.g., a range between 20° C. and −11° C.).

In an embodiment, in the graph 830, a time (t=t7) may be a time at which the second housing 204 is positioned at the second position P2. The driving frequency of the driving motor 510 in the graph 830 is the driving frequency between the driving frequency shown in the graph 810 and the driving frequency shown in the graph 820, and may be C (about 2343 pps), and the time t=t7 may be 1020 ms.

Although not depicted in FIG. 7 and FIG. 8, in an embodiment, with the second housing 204 positioned, the processor 120 may execute a function related to the optical module 205. In an embodiment, if the function related to the optical module 205 is executed and then terminated (or completed), the processor 120 may control the driving unit 501 to move the second housing 204 in the second direction L2 (e.g., in a direction for moving the second housing 402 to an accommodation unit of the first housing 210).

While FIG. 7 and FIG. 8 describe example embodiments in which the second housing 204 moves in the first direction L1, the embodiments of moving the second housing 204 in the first direction L1 may be also applied to embodiments of moving the second housing 204 in the second direction L2 in the same or similar manner, with the second housing 204 protruding from the first housing 210 (or with the second housing 204 positioned at the second position P2).

Figure 9:
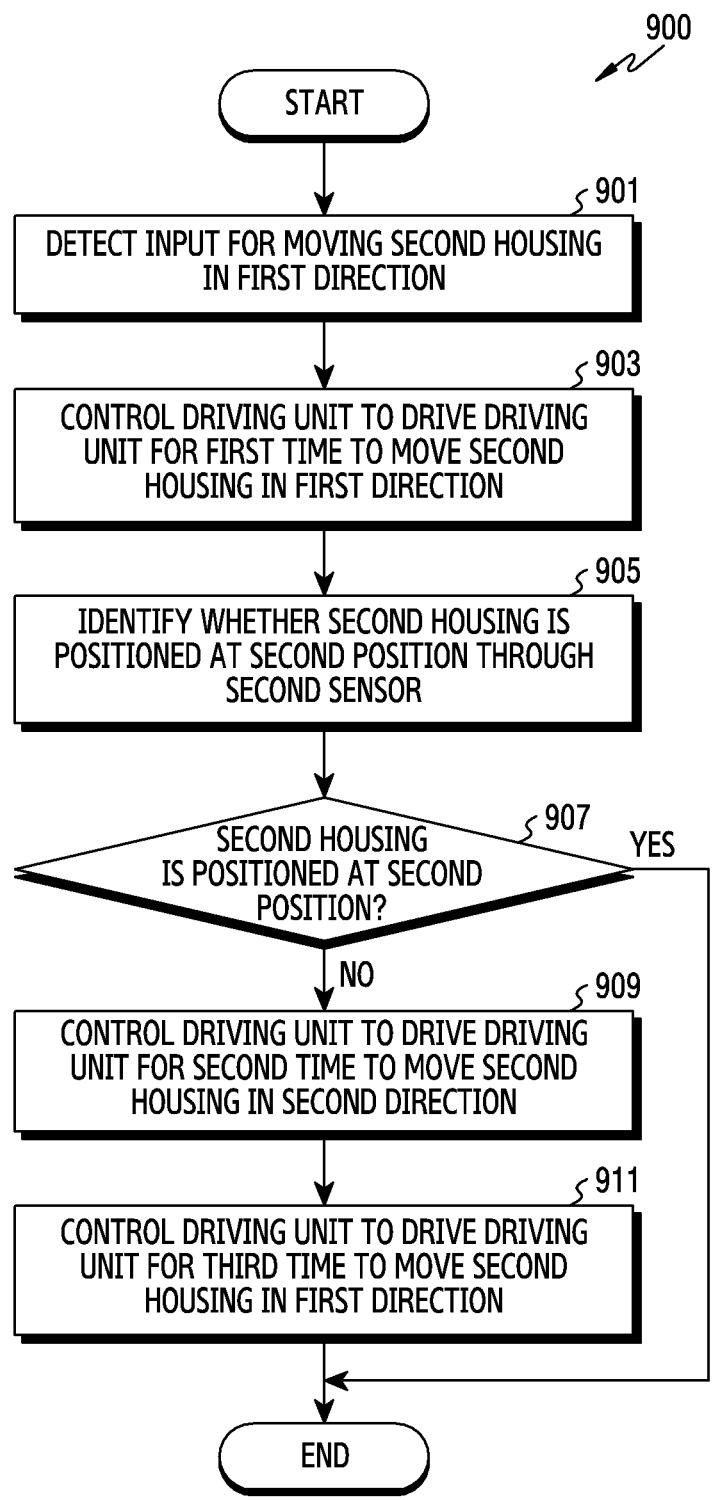
FIG. 9 is a flowchart illustrating an example method for moving part of an electronic device including an operation of moving a second housing in a second direction, according to various embodiments.

FIG. 9 is a flowchart illustrating an example method for moving part of an electronic device 101 including an operation of moving a second housing 204 in a second direction L2, according to various embodiments.

Figure 10:
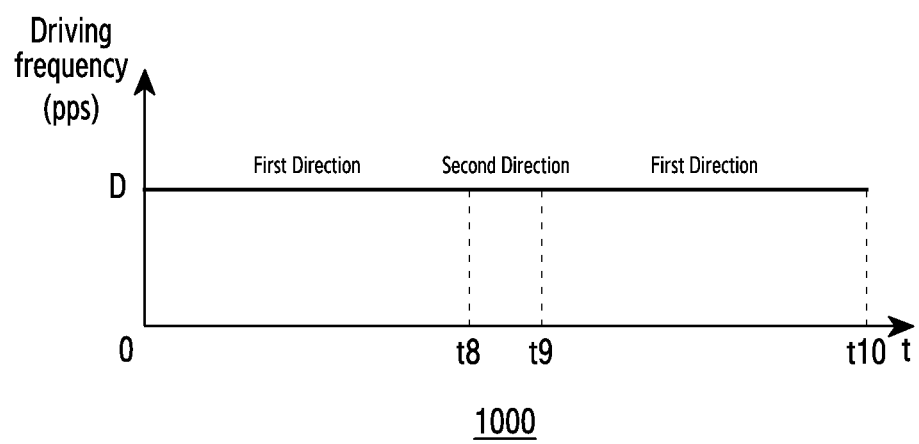
FIG. 10 is a diagram illustrating an example method for moving part of an electronic device including an operation of moving a second housing in a second direction, according to various embodiments.
Figure 11:
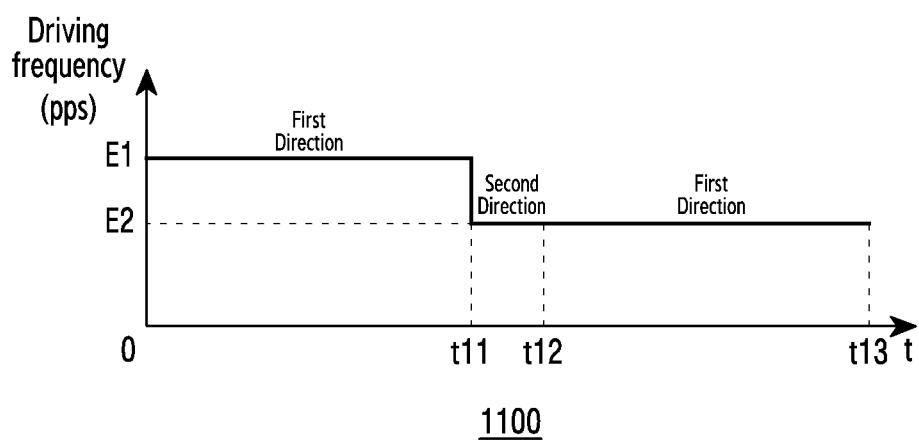
FIG. 11 is a diagram illustrating an example method for moving part of an electronic device including an operation of moving a second housing in a second direction, according to various embodiments.

FIG. 10 and FIG. 11 are diagrams illustrating an example method for moving part of an electronic device 101 including an operation of moving a second housing 204 in a second direction L2, according to various embodiments.

Referring to FIG. 9 through FIG. 13, in operation 901, in an embodiment, the processor 120 may detect an input for moving the second housing 204 in the first direction L1. Since embodiments of operation 901 are at least in part identical or similar to the embodiments of operation 701 of FIG. 7, their detailed descriptions may not be repeated here.

In operation 903, in an embodiment, the processor 120 may control the driving unit 501 to drive the driving unit 501 during a first time to move the second housing 204 in the first direction L1. For example, the processor 120 may control the driving unit 501 to rotate the driving motor 510 of the driving unit 501 at a set driving frequency to satisfy a designated condition (e.g., a condition for positioning at a specific position, during the first time) to move the second housing 204 in the first direction L1. According to an embodiment, to obtain whether it is positioned at the specific position, the position of the second housing 204 may be obtained through a separate sensor for obtaining the position of the second housing 204 or a sensing method, and a control operation according to the position may be performed. For example, if a plurality of sensors (e.g., a plurality of hall sensors) for obtaining the position of the second housing 204 is disposed inside the electronic device, a plurality of positions (e.g., a third position, a fourth position, a fifth position) of the second housing 204 may be obtained using information sensed by the sensor respectively, and thus the control of the driving unit 501 may be determined.

In an embodiment, the processor 120 may control the driving unit 501 to drive the driving unit 501 during the first time designated to move the second housing 204 in the first direction L1. For example, the processor 120 may designate a time required (or to be taken) for the second housing 204 to move from the first position P1 to the second position P2 as the first time. The processor 120 may designate a driving time of the driving motor 510 required to move the second housing 204 from the first position P1 to the second position P2 as the first time.

For example, the processor 120 may designate the time interval from the time t=0 to times t=t8, t=t11, t=t14, or t=t19 each as the first time, in FIG. 10 through FIG. 13.

In an embodiment, the processor 120 may designate the first time, based on the temperature of the electronic device 101. For example, the processor 120 may obtain temperature information of the electronic device 101 from the first sensor 221 for detecting the temperature of the electronic device 101. The processor 120 may identify the driving frequency of the driving motor 510 corresponding to the temperature of the electronic device 101, as explained in the embodiments of operation 705 of FIG. 7. If the temperature of the electronic device 101 is the room temperature, the processor 120 may designate the time interval from the time t=0 to the time t=t3 in the graph 810 as the first time. If the temperature of the electronic device 101 is low, the processor 120 may designate the time interval from the time t=0 to the time t=t6 in the graph 820 as the first time. However, it is not limited thereto.

In operation 905, in an embodiment, the processor 120 may identify whether the second housing 204 is positioned at the second position P2, through the second sensor (e.g., a hall sensor) for detecting the position of the second housing 204.

In an embodiment, the processor 120 may identify whether the second housing 204 is positioned at the second position P2, through the second sensor after the first time from the timing at which the second housing 204 starts moving at the first position P1.

In an embodiment, at a timing at which the first time and an additional time (or a margin time) elapse from the timing at which the second housing 204 starts moving at the first position P1, the processor 120 may identify whether the second housing 204 is positioned at the second position P2 through the second sensor. For example, if controlling the driving unit 501 to drive the driving motor 510 at the driving frequency shown in the graph 830 of FIG. 8, the second housing 204 may identify whether the second housing 204 is positioned at the second position P2 through the second sensor at the timing at which the time t7 (e.g., about 1020 ms) and an additional time (e.g., 80 ms) elapse, after the second housing 204 starts moving at the first position P1. However, it is not limited thereto, and the processor 120 may identify whether the second housing 204 is positioned at the second position P2 through the second sensor, at the timing at which the first time elapses from the timing at which the second housing 204 starts moving at the first position P1.

According to an embodiment, the second sensor may identify whether the second housing 204 arrived at the second position P2 through a magnet (magnetic) disposed in the second housing 204, and, if sensing the magnet of the second housing 204 regardless of the first time and determining that the second housing 204 arrived at the second position P2, the second sensor may terminate (e.g., deactivate). According to an embodiment of the disclosure, determining whether the second housing 204 is positioned at the second position P2 may be continuously performed in real time. Determining whether the second housing 204 arrived at the second position P2 may be determined regardless of the first time.

In an embodiment, if detecting that the magnet disposed in the second housing 204 is positioned at a position corresponding to the position of the hall sensor IC, the processor 120 may identify that the second housing 204 is positioned at the second position P2. For example, if detecting that the magnet disposed in the second housing 204 is positioned at a position overlapping the position of the hall sensor IC 225, or within a designated distance, the processor 120 may identify that the second housing 204 is positioned at the second position P2.

In an embodiment, if detecting that the magnet disposed in the second housing 204 is positioned at a position not corresponding to the position of the hall sensor IC 225, the processor 120 may identify that the second housing 204 is not positioned at the second position P2. For example, if not detecting the magnet disposed in the second housing 204, or if detecting the position outside the designated distance, the processor 120 may identify that the second housing 204 is not positioned at the second position P2.

In operation 907, in an embodiment, if the processor 120 identifies that the second housing 204 is positioned at the second position P2, the processor 120 may execute a function related to the optical module 205. For example, if the processor 120 identifies that the second housing 204 is positioned at the second position P2, the processor 120 may activate the camera 212 embedded in the optical module 205. As another example, if the processor 120 identifies that the second housing 204 is positioned at the second position P2, the processor 120 may activate the camera 212 embedded in the optical module 205, and perform a photographing operation (e.g., a preview image acquisition operation) through the activated camera 212.

In operation 907, in an embodiment, if the processor 120 determines that the second housing 204 is not positioned at the second position P2, in operation 909, in an embodiment, the processor 120 may control the driving unit 501 to drive the driving unit 501 for a second time to move the second housing 204 in the second direction L2. For example, the processor 120 may control the driving unit 501 to rotate the driving motor 510 of the driving unit 501 at a set driving frequency for the second time to move the second housing 204 in the second direction L2. According to an embodiment, if the second sensor detects the second housing 204 and senses the position at the second position P2 even though the second time is not finished, the end step may be performed immediately.

In an embodiment, the processor 120 may control the driving unit 501 to drive the driving unit 501 for the second time designated to move the second housing 204 in the second direction L2. The reason the driving unit 501 is controlled again with a different time may, for example, if the movement to the second position is caught by a foreign substance (e.g., dust), control the driving unit 501 to move the second housing in a different direction, and to move it again to a desired position. For example, as shown in FIG. 10, the driving unit 501 may be controlled to move the second housing 204 in the first direction L1 during a time interval from a time t=0 to a time t=t8, and the driving unit 501 may be controlled to move the second housing 204 in the second direction L2 during a time interval from the designated time t=t8 to a time t=t9.

In an embodiment, the processor 120 may identically set the driving frequency of the driving motor 510 for moving the second housing 204 in the first direction L1, and the driving frequency of the driving motor 510 for moving the second housing 204 in the second direction L2. If the driving frequencies of the driving motor 510 are set identically, the motor may be moved constantly. By setting the identical driving frequencies, power consumption caused by switching the driving frequency may be prevented and/or reduced.

For example, as shown in a graph 1000 of FIG. 10, the driving frequency of the driving motor 510 driven for a first time (e.g., a time interval from the time t=0 to the time t=t8) and the driving frequency of the driving motor 510 driven for a second time (e.g., a time interval from the time t=t8 to a time t=t9) may be set to D identically.

In an embodiment, the processor 120 may differently set the driving frequency of the driving motor 510 for moving the second housing 204 in the first direction L1, and the driving frequency of the driving motor 510 for moving the second housing 204 in the second direction L2.

In an embodiment, the processor 120 may set the driving frequency of the driving motor 510 for moving the second housing 204 in the second direction L2 to be lower than the driving frequency of the driving motor 510 for moving the second housing 204 in the first direction L1. According to an embodiment, moving by changing the driving frequency of the driving motor 510 may move the second housing 204 based on E2 driving frequency with a higher torque than the beginning. The E2 driving frequency from the beginning may move up to a time t=t11 with the high torque, but the power consumption may increase, and accordingly the driving frequency may be variably adjusted. For example, as shown in a graph 1100 of FIG. 11, the driving frequency of the driving motor 510 driven for a first time (e.g., a time interval from a time t=0 to a time t=t11) may be set to E1, and the driving frequency of the driving motor 510 driven for a second time (e.g., a time interval from the time t=t11 to a time t=t12) may be set to E2 which is lower than E1. By setting the driving frequency of the driving motor 510 for moving the second housing 204 in the second direction L2 to be lower than the driving frequency of the driving motor 510 for moving the second housing 204 in the first direction L1, the processor 120 may make the torque of the driving motor 510 for moving the second housing 204 in the first direction L1 higher than the torque of the driving motor 510 for moving the second housing 204 in the second direction L2.

In an embodiment, to move the second housing 204 in the second direction L2, the processor 120 may classify the case where the temperature of the electronic device 101 is the room temperature and the case where the temperature is the low temperature, based on the temperature of the electronic device 101, and control the driving unit 501 to drive the driving unit 501 at different driving frequencies according to the respective temperatures. For example, to move the second housing 204 in the second direction L2, the driving frequency of the driving motor 510 which is set if the temperature of the electronic device 101 is the room temperature may be set to be higher than the driving frequency of the driving motor 510 which is set if the temperature of the electronic device 101 is the room temperature. In an embodiment, if the temperature of the electronic device 101 is the room temperature, a problematic situation that the second housing 204 of the electronic device 101 protrudes to a designated position is less likely to occur than the case of the low temperature, and accordingly, at the high temperature, it is possible to process to move second housing 204 with a low torque by relatively increasing the driving frequency, and to move the second housing 204 with a high torque by relatively lowering the driving frequency at the low temperature at which the problem is highly likely to occur. Through this processing, the electronic device 101 may reduce the power consumption, and reduce abnormal operations of the protruding operation of the second housing 204.

The following [Table 1] may be a table comparing driving the driving motor 510 at a constant driving frequency regardless of the temperature (e.g., driving according to the graph 830), and driving with a different driving frequency (e.g., driving according to the graph 810 and the graph 820) according to the temperature (e.g., the room temperature or the low temperature).

TABLE 1

| | Driving at a constant driving frequency | | Driving with a different driving frequency according to the temperature (e.g., the room temperature or the low temperature) | |
|---|---|---|---|---|
| | Low temperature (manual operation at 10 degrees below zero) | Low temperature (automatic operation at 10 degrees below zero) | Low temperature (manual operation at 10 degrees below zero) | Low temperature (automatic operation at 10 degrees below zero) |
| The tilt of the optical module 205 having abnormality | 2 electronic devices/20 electronic devices (7-8 out of 10 experiments) | 3 electronic devices/ 20 electronic devices (85-100 out of 100 experiments) | 0 electronic device/20 electronic devices (0 out of 10 experiments) | 0 electronic device/20 electronic devices (0 out of 10 experiments) |
| the tilt degree | −2~−3 degree tilt | −3~−4 degree tilt | no change | no change |

In [Table 1], the manual operation may indicate an operation of moving the second housing 204 by a force applied by the user, and the automatic operation may indicate an operation of moving the second housing 204 according to application execution related to the movement of the second housing 204.

As shown in [Table 1], for each of the twenty electronic devices, if the driving motor 510 is driven with the manual operation at the constant driving frequency at the low temperature (10 degrees below zero) regardless of the temperature, the tilt of the optical module 205 (e.g., an angle tilted between the optical module 205 and the first housing 110, after moving the second housing 204 in the first direction L1 for the first time in operation 903) has abnormality in two out of the twenty electronic devices, which may correspond to 7-8 out of 10 experiments. Also, the tilt degree may be 2 degrees through 3 degrees.

As shown in [Table 1], for each of the twenty electronic devices, if the driving motor 510 is driven automatically at the constant driving frequency at the low temperature (10 degrees below zero) regardless of the temperature, the tilt of the optical module 205 has abnormality in three out of the twenty electronic devices, which may correspond to 85-100 out of 100 experiments. Also, the tilt degree may be 3 degrees through 4 degrees As shown in [Table 1], for each of the twenty electronic devices, if the driving motor 510 is manually driven at a different driving frequency according to the temperature, no abnormality occurs in the tilt of the optical module 205, and the tilt has no change as well.

As shown in [Table 1], for each of the twenty electronic devices, if the driving motor 510 is automatically driven at a different driving frequency according to the temperature, no abnormality occurs in the tilt of the optical module 205, and the tilt has no change as well.

In an embodiment, the processor 120 may control the driving unit 501 to drive the driving unit 501 to move the second housing 204 by a designated distance or to a designated position in the second direction L2. For example, based on position information of the second housing 204 obtained through the second sensor, the processor 120 may control the driving unit 501 to drive the driving unit 501 to move the second housing 204 by the designated distance or to the designated position in the second direction L2.

In an embodiment, the electronic device 101 may obtain the position of the second housing 204 using a sensor for determining the position of the second housing 204 and control the driving unit 501 which moves the second housing 204 based on the position. The sensor for determining the position may operate by arranging a plurality of hall sensors, or using various position sensors such as an infrared sensor and a radar sensor. According to an embodiment of the disclosure, the position of the second housing 204 may be determined through a plurality of (e.g., three or more) hall sensors. For example, three or more hall sensor ICs, allowing the second housing 204 to detect the position of the magnet disposed in the second housing 204, may be disposed in the first housing 210, at a position between the first position P1 and the second position P2 including the first position P1 and the second position P2. For example, a plurality of hall sensors such as a third hall sensor IC, a fourth hall sensor IC, and a fifth hall sensor IC may be disposed between the first hall sensor IC 223 and the second hall sensor IC 225. Through each of the hall sensors, the second housing 204 may be identified through the hall sensors which sense the position, by the magnet (magnetic) detected if the second housing 204 moves. In an embodiment, if three or more hall sensor ICs are disposed, the position of the second housing 204 (or the magnet disposed in the second housing 204) positioned between the first position P1 and the second position P2 may be detected. However, it is not limited thereto, and, if the position of the second housing 204 positioned between the first position P1 and the second position P2 may be detected through one hall sensor IC or two hall sensor ICs, one hall sensor IC or two hall sensor ICs may be disposed in the first housing 210.

In an embodiment, if the driving unit 501 is controlled to drive the driving unit 501 to move the second housing 204 to a designated position in the second direction L2, the designated position may detect the position of any one hall sensor IC among the plurality of the hall sensor ICs disposed in the first housing 210 and the magnet disposed in the second housing 204, and estimate the position by the sensors detecting the magnetic. For example, if the magnet disposed in the second housing 204 is positioned at the third position between the position corresponding to the first position P1 and the position corresponding to the second position P2, the designated position may be a position through the sensor detecting the magnetic among the hall sensor ICs disposed between the third position at which the magnet disposed in the second housing 204 and the position (e.g., a position disposed in the second direction L2 from the third position) corresponding to the first position P1. The magnetic may be detected by at least one hall sensor IC, and the position of the second housing 204 may be estimated by the detected hall sensor IC. However, it is not limited thereto.

In an embodiment, if the second housing 204 moves to protrude out of the first housing 210 or to be received in the first housing 210, the friction force may be formed differently according to each position, and the processor 120 may obtain information of each friction force, and control the driving unit 501 to vary the driving frequency of the driving unit 501 based on the friction force. According to an embodiment of the disclosure, in consideration of the friction force between the first housing 210 and the second housing 204, the driving unit 501 may be controlled to move the second housing 204 in the second direction L2 by a designated distance or to a designated position. For example, while the second housing 204 moves in the first direction L1 or the second direction L2, the friction force between the first housing 210 and the second housing 204 generated while the second housing 204 moves in the first direction L1 or the second direction L2 may differ, with respect to each position between the first position P1 and the second position P2. For each position between the first position P1 and the second position P2, information of the friction force between the first housing 210 and the second housing 204 generated while the second housing 204 moves in the first direction L1 or the second direction L2 may be stored in the memory 130. In an embodiment, if the second housing 204 is positioned at the fourth position between the first position P1 and the second position P2, the processor 120 may control the driving unit 501 to drive the driving motor 510 at a driving frequency of the driving motor 510 corresponding to the friction force for each position between the fourth position and the fifth position to be moved in the second direction L2 from the fourth position. For example, if the second housing 204 moves from the fourth position to the fifth position, the processor 120 may control the driving unit 501 to drive the driving motor 510 at a driving frequency of the driving motor 510 for applying to the second housing 204 a greater force than the greatest friction force among the friction forces of the respective positions between the fourth position and the fifth position. As another example, if the second housing 204 moves from the fourth position to the fifth position, the processor 120 may control the driving unit 501 to drive the driving motor 510 at a driving frequency of the driving motor 510 for applying a greater force than the friction force generated at each position between the fourth position and the fifth position to the second housing 204 at each position between the fourth position and the fifth position.

In operation 911, the processor 120 may control the driving unit 501 to drive the driving unit 501 for the second time, and then control the driving unit 501 to drive the driving unit 501 for the third time to move the second housing 204 in the first direction L1. For example, the processor 120 may control the driving unit 501 to rotate the driving motor 510 of the driving unit 501 at a set driving frequency for the third time to move the second housing 204 again in the first direction L1.

In an embodiment, the processor 120 may control the driving unit 501 to drive the driving unit 501 for the third time designated to move the second housing 204 in the second direction L2. For example, as shown in FIG. 10, the driving unit 501 may be controlled to move the second housing 204 in the first direction L1 during the time interval from the time t=t9 to the time t=t10.

In an embodiment, the processor 120 may identically set all the driving frequency of the driving motor 510 for moving the second housing 204 in the first direction L1, the driving frequency of the driving motor 510 for moving the second housing 204 in the second direction L2, and the driving frequency of the driving motor 510 for moving the second housing 204 back in the first direction L1. The driving frequencies are all set the same to maintain the moving speed of the second housing at a constant speed, for example, by setting them to the same driving frequency. In an embodiment, power consumption caused by switching the driving frequency may be prevented and/or reduced by setting the driving frequency the same. For example, as shown in the graph 1000 of FIG. 10, the driving frequency of the driving motor 510 driven for the first time (e.g., the time interval from the time t=0 to the time t=t8), and the driving frequency of the driving motor 510 driven for the second time (e.g., the time interval from the time t=t8 to the time t=t9), and for the third time (e.g., the time interval from the t=t9 to the time t=t10) may be set identically to D.

In an embodiment, the processor 120 may be set the driving frequency of the driving motor 510 for moving the second housing 204 back in the first direction L1, which is different from the driving frequency of the driving motor 510 for moving the second housing 204 in the first direction L1 and is the same as the driving frequency of the driving motor 510 for moving the second housing 204 in the second direction L2. For example, as shown in the graph 1100 of FIG. 11, the driving frequency of the driving motor 510 driven for the first time (e.g., the time interval from the time the t=0 to the time t=t11) may be is set to E1, the driving frequency of the driving motor 510 driven for the second time (e.g., the time interval from the time t=t11 to the time t=t12) may be set to E2 which is lower than E1, and the driving frequency of the driving motor 510 driven during the third time (e.g., the time interval from the time t=t12 to the time t=t13) may be set to the same as E2.

The method for setting the driving frequency of the driving motor 510 driven for the third time is not limited to the above-described examples.

In an embodiment, the first time of operation 903 and the third time of operation 911 may be the same. For example, in FIG. 10, the time interval from the time t=0 to the time t=t8 and the time interval from time the t=t9 to the time t=t10 may be the same. However, it is not limited thereto, and the first time of operation 903 and the third time of operation 911 may be different.

Although not depicted in FIG. 9, in an embodiment, after performing the embodiments of operation 911, the processor 120 may identify whether the second housing 204 is positioned at the second position P2, through the second sensor for detecting the position of the second housing 204. In an embodiment, if the processor 120 identifies that the second housing 204 is positioned at the second position P2, the processor 120 may execute a function related to the optical module 205. In an embodiment, if the processor 120 identifies that the second housing 204 is not positioned at the second position P2, the processor 120 may perform the operation for inserting the second housing into the first housing. For example, the processor 120 may control the driving unit 501 to move the second housing 204 to the first position P1. In an embodiment, if the processor 120 identifies that the second housing 204 is not positioned at the second position P2, the processor 120 may perform again operation 909 and operation 911 and the operation of identifying whether the second housing 204 is positioned at the second position P2 for a designated number of times. If the processor 120 identifies that the second housing 204 is not positioned at the second position P2, the processor 120 may control the driving unit 501 to move the second housing 204 to the first position P1.

Although not depicted in FIG. 9, in an embodiment, the processor 120 may repeatedly perform identical or similar operations to operation 909 and operation 911.

Figure 12:
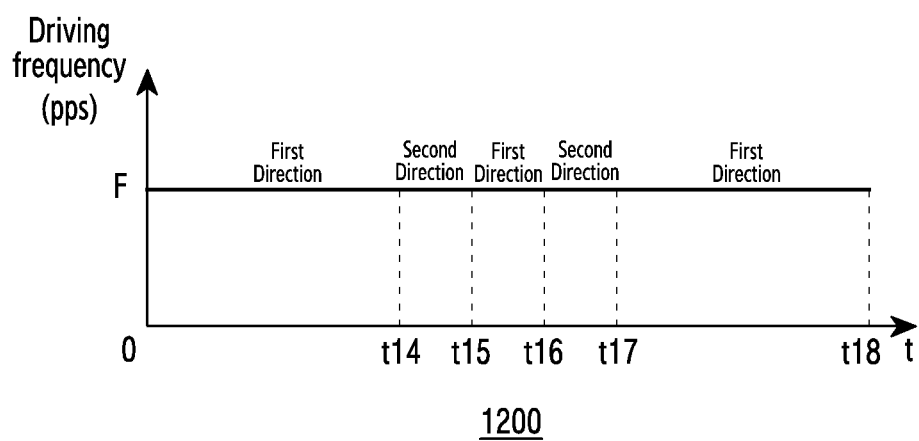
FIG. 12 is a diagram illustrating an example method for moving part of an electronic device including an operation of moving a second housing in a second direction, according to various embodiments.

For example, as shown in a graph 1200 of FIG. 12, the processor 120 may control the driving unit 501 to drive the driving unit 501 for a first time (e.g., a time interval from the time t=0 to the time t=14) to move the second housing 204 in the first direction L1. In an embodiment, after the first time passes, the processor 120 may identify whether the second housing 204 is positioned at the second position P2, and, if identifying that the second housing 204 is not positioned at the second position P2, control the driving unit 501 to drive the driving unit 501 for a second time (e.g., a time interval from the time t=14 to the time t=t15) to move the second housing 204 in the second direction L2. The processor 120 may control the driving unit 501 to drive the driving unit 501 for a third time (e.g., a time interval from the time t=15 to the time t=t16) to move the second housing 204 in the first direction L1. The processor 120 may control the driving unit 501 to drive the driving unit 501 for a fourth time (e.g., a time interval from the time t=16 to the time t=t17) to move the second housing 204 in the second direction L2. The processor 120 may control the driving unit 501 to drive the driving unit 501 for a fifth time (e.g., a time interval from the time t=17 to the time t=t18) to move the second housing 204 in the first direction L1. In an embodiment, the first time and the fifth time may be designated to the same time in the graph 1200 of FIG. 12. However, it is not limited thereto. In an embodiment, the second time through the fourth time in the graph 1200 of FIG. 12 each may be the same time (e.g., about 200 ms). However, it is not limited thereto.

The graph 1200 of FIG. 12 illustrates that the driving motor 510 is driven at the same driving frequency from the time t=0 to the time t=t18, but it is not limited thereto. For example, the processor 120 may control the driving motor 510 to drive the driving motor 510 at a driving frequency F for the first time (e.g., the time interval from the time t=0 to the time t=t14), and to drive the driving motor 510 at a driving frequency lower than F for the second time through the fifth time (e.g., the time interval from the time t=t14 to the time t=t18)). However, it is not limited thereto.

Figure 13:
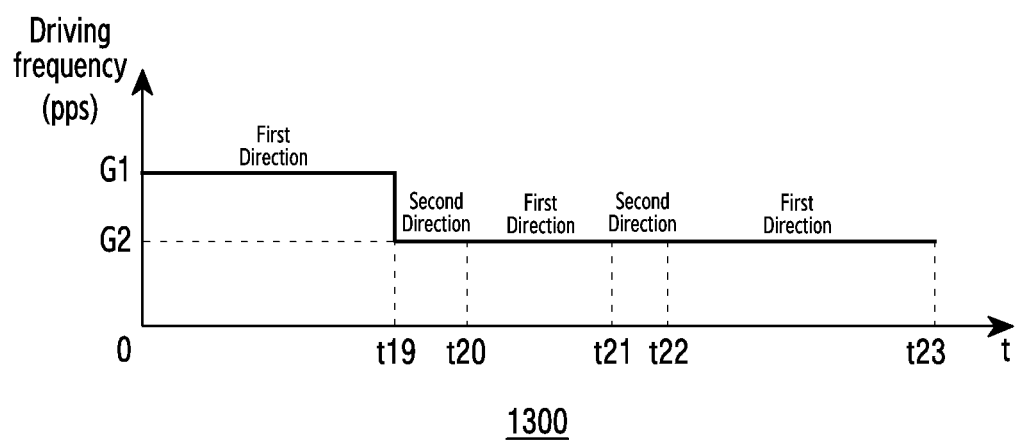
FIG. 13 is a diagram illustrating an example method for moving part of an electronic device including an operation of moving a second housing in a second direction, according to various embodiments.

In an embodiment, as shown in a graph 1300 of FIG. 13, the processor 120 may control the driving unit 501 to drive the driving unit 501 for a first time (e.g., a time interval from the time t=0 to the time t=t19) to move the second housing 204 in the first direction L1. In an embodiment, after the first time passes, the processor 120 may identify whether the second housing 204 is positioned at the second position P2, and, if identifying that the second housing 204 is not positioned at the second position P2, control the driving unit 501 to drive the driving unit 501 for a second time (e.g., a time interval from the time t=t19 to the time t=t20) to move the second housing 204 in the second direction L2. The processor 120 may control the driving unit 501 to drive the driving unit 501 for a third time (e.g., a time interval from the time t=20 to the time t=t21) to move the second housing 204 in the first direction L1. The processor 120 may control the driving unit 501 to drive the driving unit 501 for a fourth time (e.g., a time interval from the time t=t21 to the time t=t22) to move the second housing 204 in the second direction L2. The processor 120 may control the driving unit 501 to drive the driving unit 501 for a fifth time (e.g., a time interval from the time t=t22 to the time t=t23) to move the second housing 204 in the first direction L1. In an embodiment, the first time and the fifth time may be designated to the same time in the graph 1300 of FIG. 13. However, it is not limited thereto. In an embodiment, the second time, the third time, and the fourth time may be differently designated in the graph 1300 of FIG. 13. For example, the third time (e.g., about 200 ms) may be designated to be longer than the second time (e.g., about 100 ms), and the fourth time (e.g., about 50 ms) may be designated to be shorter than the second time (e.g., about 100 ms).

In an embodiment, as shown in the graph 1300 of FIG. 13, the processor 120 may control the driving unit 501 to drive the driving motor 510 for the first time at a driving frequency G1, and to drive the driving motor 510 for the second time through the fifth time at a driving frequency G2 which is lower than G1. However, it is not limited thereto.

In an embodiment, the graph 1200 of FIG. 12 may represent the driving frequency of the driving motor 510 which operates at a low temperature (e.g., about 11 degrees below zero), and the graph 1300 of FIG. 13 may represent the driving frequency of the driving motor 510 which operates at the room temperature (e.g., about 20 degrees).

While FIG. 9 through FIG. 13 illustrate example embodiments in which the second housing 204 moves in the first direction L1, the embodiments in which the second housing 204 moves in the second direction L2 may be applied in the same or similar manner to the embodiments in which the second housing 204 moves in the first direction L1, with the second housing 204 protruding from the first housing 210 (or with the second housing 204 positioned at the second position P2).

Figure 14:
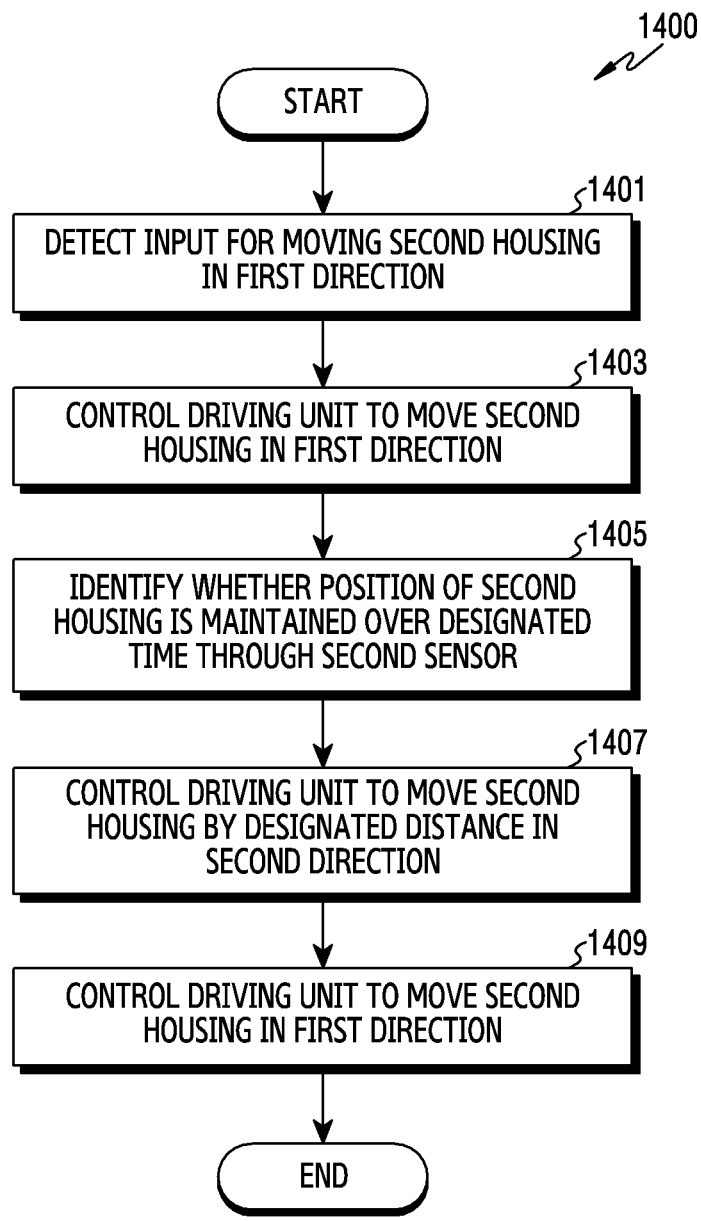
FIG. 14 is a flowchart illustrating an example method for moving part of an electronic device, based on a position of the electronic device, according to various embodiments.

FIG. 14 is a flowchart 1400 illustrating an example method for moving part of an electronic device 101, based on a position of the electronic device 101, according to various embodiments.

FIG. 14 is a flowchart illustrating controlling the driving unit 501 based on the position of the second housing 204.

According to an embodiment, a plurality of hall sensor ICs may be disposed between the first position P1 and the second position P2. The magnet disposed on at least a part of the second housing 204 may be detected by the plurality of the hall sensor ICs, and the position of the second housing 204 may be determined based on the detection. FIG. 14 may represent the case in which one hall sensor IC or two hall sensor ICs are disposed in the first housing 210, if the position of the second housing 204 positioned between the first position P1 and the second position P2 may be detected through one hall sensor IC or two hall sensor ICs. However, the sensor for detecting the position of the second housing 204 is not limited to the hall sensor, and all sensors for detecting the position of the second housing 204, such as an infrared sensor or a laser, may be included.

In operation 1401, in an embodiment, the processor 120 may detect an input for moving the second housing 204 in the first direction L1.

Since the embodiments of operation 1401 are at least in part identical or similar to the embodiments of operation 701 of FIG. 7, their detailed descriptions may not be repeated here.

In operation 1403, the processor 120 may control the driving unit 501 to move the second housing 204 in the first direction L1. For example, in response to detecting the input for moving the second housing 204 in the first direction L1, the processor 120 may control the driving unit 501 to rotate the driving motor 510 of the driving unit 501 at the set driving frequency to move the second housing 204 in the first direction L1.

In operation 1405, while the second housing 204 is moved in the first direction L1, the processor 120 may identify whether the position of the second housing 204 is maintained over a designated time through the second sensor for detecting the position of the second housing 204. For example, while the second housing 204 is moved in the first direction, the processor 120 may identify whether the second housing 204 is stationary over the designated time, based on the position information of the second housing 204 obtained from the second sensor.

In operation 1407, in an embodiment, if the processor 120 identifies that the position of the second housing 204 is maintained over the designated time, the processor 120 may control the driving unit 501 to move the second housing 204 by a designated distance (or a designated position) in the second direction L2. For example, the processor 120 may control the driving unit 501 to rotate the driving motor 510 of the driving unit 501 at the set driving frequency to move the second housing 204 by the designated distance in the second direction L2.

In an embodiment, the processor 120 may differently set the driving frequency of the drive motor 510 for moving the second housing 204 in the first direction L1, and the driving frequency of the driving motor 510 for moving the second housing 204 by the designated distance in the second direction L2. However, it is not limited thereto, and the processor 120 may identically set the driving frequency of the drive motor 510 for moving the second housing 204 in the first direction L1, and the driving frequency of the driving motor 510 for moving the second housing 204 by the designated distance in the second direction L2.

In an embodiment, the processor 120 may set the driving frequency of the driving motor 510 for moving the second housing 204 by the designated distance in the second direction L2, to be lower than the driving frequency of the drive motor 510 for moving the second housing 204 in the first direction L1.

In an embodiment, to move the second housing 204 by the designated distance in the second direction L2, the processor 120 may control the driving unit 501 to drive the driving unit 501, based on the temperature of the electronic device 101. For example, to move the second housing 204 by the designated distance in the second direction L2, the driving frequency of the driving motor 510 which is set if the temperature of the electronic device 101 is the room temperature may be set to be higher than the driving frequency of the driving motor 510 which is set if the temperature of the electronic device 101 is the high temperature.

In an embodiment, by considering the friction force between the first housing 210 and the second housing 204, the processor 120 may control the driving unit 501 to move the second housing 204 in the second direction L2 by the designated distance or to the designated position. For example, while the second housing 204 moves in the first direction L1 or the second direction L2, the friction force between the first housing 210 and the second housing 204 generated while the second housing 204 moves in the first direction L1 or the second direction L2 may differ, with respect to each position between the first position P1 and the second position P2. For each position between the first position P1 and the second position P2, the information of the friction force between the first housing 210 and the second housing 204 generated while the second housing 204 moves in the first direction L1 or the second direction L2 may be stored in the memory 130. In an embodiment, if the second housing 204 is positioned at the third position between the first position P1 and the second position P2, the processor 120 may control the driving unit 501 to drive the driving motor 510 at the driving frequency of the driving motor 510 corresponding to the friction force for each position between the second position and the fourth position to be moved from the second position in the second direction L2.

In an embodiment, if the processor 120 identifies that the position of the second housing 204 is positioned at the second position P2, without maintaining over the designated time, the processor 120 may execute the function related to the optical module 205.

In operation 1409, in an embodiment, the processor 120 may control the driving unit 501 to move the second housing 204 in the first direction L1, at the position moved in the second direction L2. For example, the processor 120 may control the driving unit 501 to rotate the drive motor 510 of the driving unit 501 at the set driving frequency to move the second housing 204 in the first direction L1 from the position moved in the second direction L2.

Although not depicted in FIG. 14, in an embodiment, after operation 1409, the processor 120 may repeatedly perform operation 1405 through operation 1409 for a designated number of times. In an embodiment, after repeatedly performing operation 1405 through operation 1409 for a designated number of times, the processor 120 may control the driving unit 501 to insert the second housing 204 into the first housing 210, if identifying that the second housing 204 is maintained at a position between the first position P1 and the second position P2 over a designated time (e.g., if identifying that the second housing 204 does not reach the second position P2).

Figure 15:
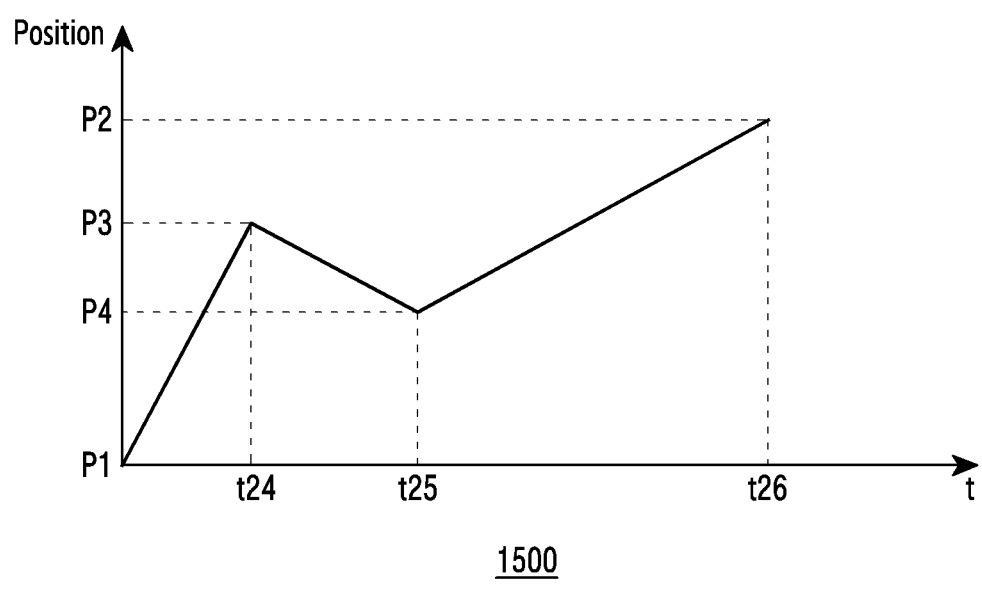
FIG. 15 is a diagram illustrating an example method for moving part of an electronic device, based on a position of the electronic device, according to various embodiments.
Figure 16:
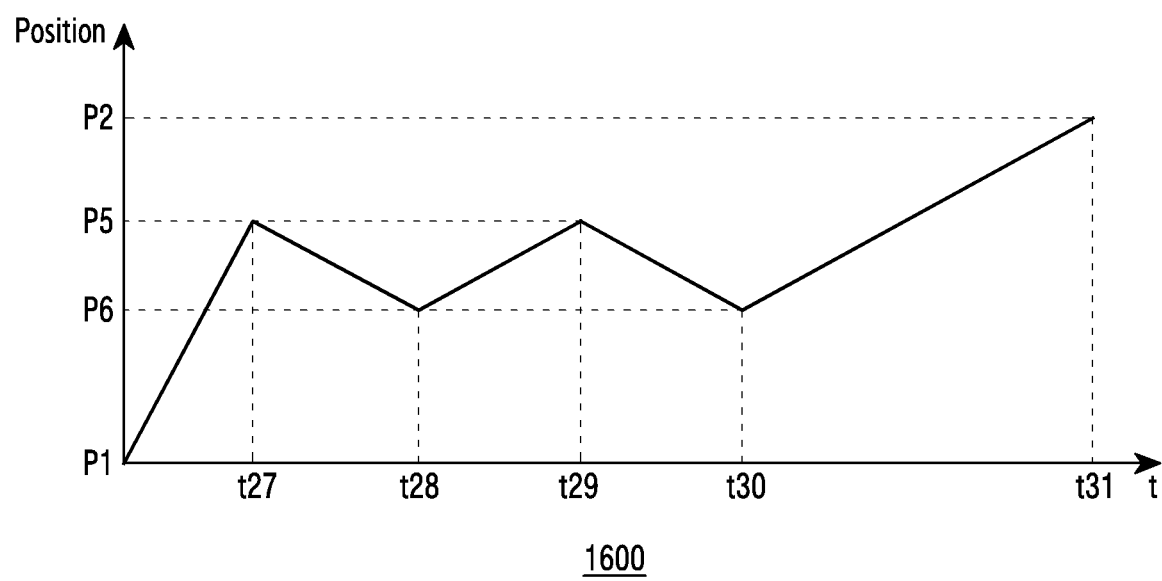
FIG. 16 is a diagram illustrating an example method for moving part of an electronic device, based on a position of the electronic device, according to various embodiments.
Figure 17:
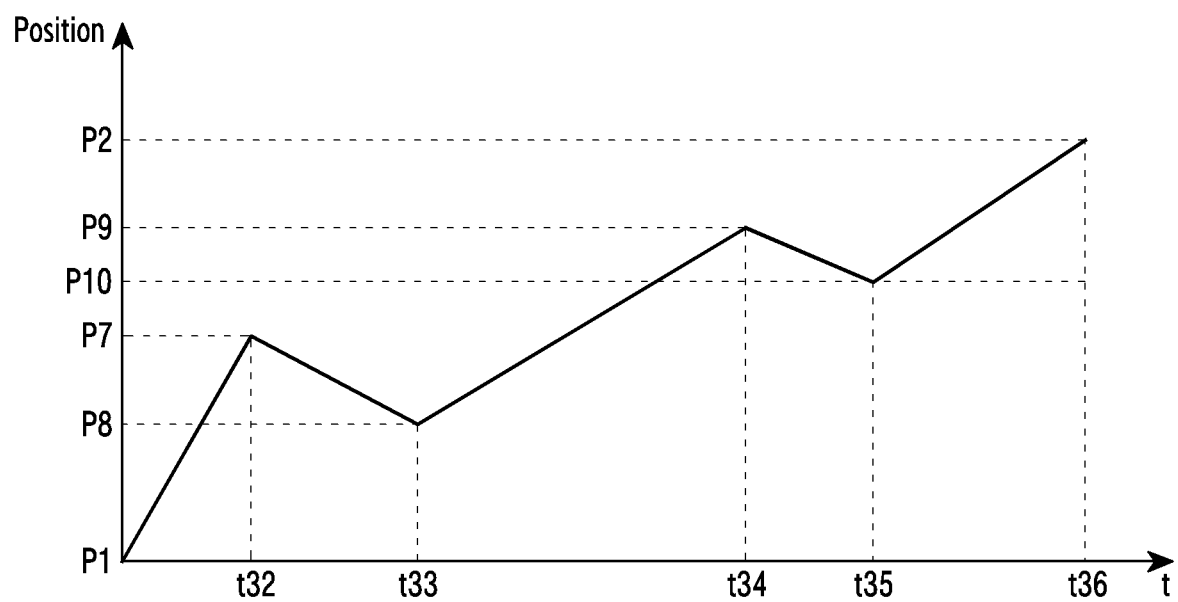
FIG. 17 is a diagram illustrating an example method for moving part of an electronic device, based on a position of the electronic device, according to various embodiments.

FIGS. 15, 16 and FIG. 17 are diagrams illustrating an example method of moving part of an electronic device 101, based on a position of the electronic device 101, according to various embodiments.

Referring to FIG. 15 through FIG. 17, FIG. 15 is a graph showing that, if the second housing 204 does not reach the designated position, the processor moves it to a specific position and then re-attempts to move it to the designated position. As shown in the graph 1500, in an embodiment, the processor 120 may control the driving unit 501 to move the second housing 204 in the first direction L1, during a time interval from time t=0 to time t=t24. At this time, the second housing may move from P1 to P3. The electronic device 101 (e.g., the processor 120) may determine that the second housing 204 is not positioned to the final destination P2 at the time t=t24, and attempt to place it back to P2 by changing the position of the second housing 204. At this time, the reason why the second housing 204 does not normally reach P2 may be various. For example, because the second housing 204 does not normally move to the position P2 within the designated time due to various reasons such as friction increase by a foreign substance (e.g., dust) or temperature decrease, the processor 120 may move the second housing in a different direction and attempt to move it back to the position P2. In an embodiment, based on the position information of the second housing 204 obtained from the second sensor, the processor 120 may detect that the second housing 204 is maintained over a designated time, at the time t=t24 and the position P3. In an embodiment, the processor 120 may control the driving unit 501 for the time interval from the t=t24 to the time t=t25, to move the second housing 204 in the second direction L2 from the position P3 to the designated position P4. In an embodiment, the processor 120 may control the driving unit 501 during the time interval from the t=t25 to the time t=t26, to move the second housing 204 in the first direction L1 from the position P4 to the position P2.

In an embodiment, if the second housing 204 is maintained between over a designated time the first position P1 and the second position P2, the processor 120 may control the driving unit 501 to repeatedly perform the operation of moving the second housing in the second direction L2 and moving the second housing 204 back in the first direction L1.

For example, FIG. 16 is a graph illustrating that the position movement is repeatedly performed at a specific point to normally move the second housing to a designated position. FIG. 16 is a graph illustrating that the second housing 204 moves to pass through the position maintained for a designated time if the second housing 204 moves in the second direction and then moves back in the first direction (e.g., during the time interval from the time t=t28 to the time t=t29). In an embodiment, the processor 120 may control the driving unit 501 to move the second housing 204 in the first direction L1, for the time interval from the time t=0 to the time t=t27. In an embodiment, based on the position information of the second housing 204 obtained from the second sensor, the processor 120 may detect that the second housing 204 is maintained over a designated time, at the time t=t27 and the position P5. In an embodiment, the processor 120 may control the driving unit 501 for the time interval from the time t=t27 to the time t=t28, to move the second housing 204 in the second direction L2 from the position P5 to the designated position P6. In an embodiment, the processor 120 may control the driving unit 501 during the time interval from the time t=t28 to the time t=t29, to move the second housing 204 in the first direction L1 from the position P6 to the designated position P7. In an embodiment, the processor 120 may control the driving unit 501 during the time interval from the time t=t29 to the time t=t30, to move the second housing 204 in the second direction L2 from the position P5 to the designated position P6. In an embodiment, regardless of whether the second housing 204 is maintained at the position P5 over a designated time, the processor 120 may control the driving unit 501 during the time interval from the time t=t29 to the time t=t30, to move the second housing 204 in the second direction L2 from the position P5 to the designated position P6. In an embodiment, the processor 120 may control the driving unit 501 during the time interval from the time t=t30 to the time t=t31, to move the second housing 204 in the first direction L1 from the position P6 to the position P2.

As another example, FIG. 17 is a graph illustrating that the position of the second housing 204 is repeatedly moved in the first direction or the second direction, to normally move the second housing 204 to a designated position. FIG. 17 is a graph illustrating that the second housing 204 moves to pass through the position maintained for a designated time if the second housing 204 moves in the second direction and then moves back in the first direction (e.g., for the time interval from the time t=t33 to the time t=t34). As shown in the graph 1700 of FIG. 17, in an embodiment, the processor 120 may control the driving unit 501 to move the second housing 204 in the first direction L1, during the time interval from the time t=0 to the time t=t32. In an embodiment, based on the position information of the second housing 204 obtained from the second sensor, the processor 120 may detect that the second housing 204 is maintained over a designated time, at the time t=t32 and the position P7. In an embodiment, the processor 120 may control the driving unit 501 during the time interval from the time t=t32 to the time t=t33, to move the second housing 204 in the second direction L2 from the position P7 to the designated position P8. In an embodiment, the processor 120 may control the driving unit 501 during the time interval from the time t=t33 to the time t=t34, to move the second housing 204 in the first direction L1 from the position P8 to a designated position P9. The designated position P9 may be a position passing the position P7 at which the second housing 204 is maintained over the designated time during the time interval from the time t=t33 to the time t=t34. In an embodiment, the processor 120 may control the driving unit 501 during the time interval from the time t=t34 to the time t=t35, to move the second housing 204 in the second direction L2 from the position P9 to a designated position P10. The designated position P10 may be a position not passing the position P7 at which the second housing 204 is maintained over the designated time during the time interval from the time t=t34 to the time t=t35. In an embodiment, the processor 120 may control the driving unit 501 during the time interval from the time t=t35 to the time t=t36, to move the second housing 204 in the first direction L1 from the position P10 to the position P2.

The graphs 1600 and 1700 of FIG. 16 and FIG. 17 illustrate that the second housing 204 moves twice in the second direction L2, which is not limited thereto, and moving the second housing 204 in the second direction L2 for a designated number of times (e.g., the number of times designated to three or more) may be applied to the example in the same or similar manner.

While FIG. 14 through FIG. 17 illustrate example embodiments in which the second housing 204 moves in the first direction L1, the embodiments in which the second housing 204 moves in the second direction L2 may be applied in the same or similar manner to the embodiments in which the second housing 204 moves in the first direction L1, with the second housing 204 protruding from the first housing 210 (or with the second housing 204 positioned at the second position P2).

In an embodiment, according to the aforementioned embodiments, the electronic device may allow the second housing 204 accommodating at least one electronic component to normally slide, by minimizing and/or reducing the influence of the temperature change of the electronic device and the foreign substance introduction. Thus, the electronic device may normally perform the function related to the optical module 205, and if the second housing 204 is stationary while moving from the first position P1 to the second position P2, consume only minimum power to move the second housing 204 to the second position P2.

In addition, a data structure used in the embodiment of the present disclosure as described above may be recorded on a computer-readable recording medium through various means. The computer-readable recording medium includes storage media such as magnetic storage media (e.g., a ROM, a floppy disk, a hard disk, etc.) and optical reading media (e.g., a CD-ROM, a digital versatile disk (DVD), etc.).

While the disclosure has been illustrated and described with reference to various example embodiments, it will be understood that the various example embodiments are intended to be illustrative, not limiting. It will be further understood by those of ordinary skill in the art that the various example embodiments of the present disclosure may be implemented in a modified form without departing from essential characteristics of the present disclosure. Therefore, the disclosed embodiments should be considered in a descriptive sense, not in a limiting sense. The scope of the present disclosure is not limited to the above-stated descriptions, and all differences within the equivalent scope should be understood as being included in the scope present disclosure, including the appended claims and their equivalents. It should also be understood that any of the embodiment(s) described herein may be used in conjunction with any other embodiment(s) described herein.

What is claimed is:

1. An electronic device comprising:
 a first housing;
 a second housing coupled to the first housing, and configured to move in a first direction from a first position to a second position or in a second direction opposite the first direction between the first position at least in part accommodated in the first housing and the second position protruding from the first housing;
 a driving unit for moving the second housing in the first direction or the second direction;
 a first sensor configured to detect a position of the second housing;
 at least one processor operably coupled with the driving unit and the first sensor; and
 a memory operably coupled with the at least one processor,
 wherein the memory stores instructions which, when executed, cause the at least one processor to:
 detect an input for moving the second housing in the first direction,
 control the driving unit to drive the driving unit for a first time to move the second housing in the first direction,
 identify whether the second housing is positioned at the second position, through the first sensor,
 in response to identifying that the second housing is not positioned at the second position, control the driving unit to drive the driving unit for a second time to move the second housing in the second direction, and
 control the driving unit to drive the driving unit for the second time, and control the driving unit to drive the driving unit for a third time to move the second housing in the first direction.

2. The electronic device of claim 1, wherein the first sensor comprises a hall sensor disposed in the first housing, the first sensor comprising a first hall sensor integrated circuit (IC) and a second hall sensor IC,
 the first hall sensor IC is configured to detect that the second housing is at the first position, by detecting a magnet disposed in the first housing, and
 the second hall sensor IC is configured to detect that the second housing is at the second position, by detecting the magnet.

3. The electronic device of claim 1, wherein the instructions, when executed, cause the at least one processor to:
 in response to identifying that the second housing is not positioned at the second position, control the driving unit to drive the driving unit for the second time to move the second housing in the second direction.

4. The electronic device of claim 3, wherein the instructions, when executed, cause the at least one processor to:
make a driving frequency of the driving unit driven for the second time less than a driving frequency of the driving unit driven for the first time.

5. The electronic device of claim 3, wherein the instructions, when executed, cause the at least one processor to:
control the driving unit to drive the driving unit for the second time, and control the driving unit to drive the driving unit for a fourth time to move the second housing in the first direction, and
control the driving unit to drive the driving unit for the fourth time, and control the driving unit to drive the driving unit for a fifth time to move the second housing in the second direction, before controlling the driving unit to drive the driving unit for the third time to move the second housing in the first direction.

6. The electronic device of claim 1, wherein the instructions, when executed, cause the at least one processor to:
designate the third time to be a same time as the first time.

7. The electronic device of claim 1, wherein the instructions, when executed, cause the at least one processor to,
in response to identifying that the second housing is not positioned at the second position, control the driving unit to drive the driving unit to move the second housing by a specified distance in the second direction.

8. The electronic device of claim 1, further comprising:
a second sensor configured to detect a temperature of the electronic device,
wherein the instructions, when executed, cause the at least one processor to:
obtain information of the temperature from the second sensor, and
control the driving unit to drive the driving unit at a driving frequency corresponding to the temperature for the second time to move the second housing in the second direction.

9. An electronic device comprising:
a first housing;
a second housing coupled to the first housing, and configured to move in a first direction from a first position to a second position or in a second direction opposite the first direction between the first position at least in part accommodated in the first housing and the second position protruding from the first housing;
a driving unit for moving the second housing in the first direction or the second direction;
a first sensor configured to detect a temperature of the electronic device;
a second sensor configured to detect a position of the second housing;
at least one processor operably coupled with the driving unit, the first sensor, and the second sensor; and
a memory operably coupled with the at least one processor,
wherein the memory stores instructions which, when executed, cause the at least one processor to:
detect an input for moving the second housing in the first direction,
obtain information of the temperature of the electronic device through the first sensor,
based on the temperature being a first specified temperature:
control the driving unit to drive the driving unit for a first time at a first driving frequency to move the second housing in the first direction,
identify whether the second housing is positioned at the second position through the first sensor,
in response to identifying that the second housing is not positioned at the second position, control the driving unit to drive the driving unit for a second time at a second driving frequency to move the second housing in the second direction, and
control the driving unit to drive the driving unit for the second time, and control the driving unit to drive the driving unit for a third time at a third driving frequency to move the second housing in the first direction, and
based on the temperature being a second specified temperature:
control the driving unit to drive the driving unit for the first time at a fourth driving frequency to move the second housing in the first direction,
identify whether the second housing is positioned at the second position through the first sensor,
in response to identifying that the second housing is not positioned at the second position, control the driving unit to drive the driving unit for the second time at a fifth driving frequency to move the second housing in the second direction, and
control the driving unit to drive the driving unit for the second time, and control the driving unit to drive the driving unit for the third time at a sixth driving frequency to move the second housing in the first direction.

10. The electronic device of claim 9, wherein the instructions, when executed, cause the at least one processor to:
identify the temperature, and
identify the driving frequency of the driving unit corresponding to the temperature.

11. The electronic device of claim 9, wherein the instructions, when executed, cause the at least one processor to:
based on the first temperature being higher than the second temperature, the first driving frequency, the second driving frequency, and the third driving frequency are set to be higher than the fourth driving frequency, the fifth driving frequency, and the sixth driving frequency, respectively.

12. The electronic device of claim 9, further comprising:
an optical module coupled to the second housing, and rotating while the second housing moves in the first direction.

13. An electronic device comprising:
a first housing;
a second housing coupled to the first housing, and configured to move in a first direction from a first position to a second position or in a second direction opposite the first direction between the first position at least in part accommodated in the first housing and the second position protruding from the first housing;
a driving unit for moving the second housing in the first direction or the second direction;
at least one position sensor configured to detect a position of the second housing;
at least one processor operably coupled with the driving unit and the at least one position sensor; and
a memory operably coupled with the at least one processor,
wherein the memory stores instructions which, when executed, cause the at least one processor to:
detect an input for moving the second housing in the first direction,
control the driving unit to drive the driving unit to move the second housing in the first direction, based on the position of the second housing being a first position, detected through the at least one position sensor, control the driving unit to drive at a first driving frequency, and based on the position of the second housing being a second position, control the driving unit to drive at a second driving frequency.

14. The electronic device of claim 13, wherein the instructions, when executed, cause the at least one processor to:

in response to identifying that the second housing is maintained at the first position over a designated time, control the driving unit to drive the driving unit at the first driving frequency to move the second housing by a first designated distance in the second direction, and based on the second housing being moved by the first designated distance, control the driving unit to drive the driving unit to move the second housing in the first direction.

15. The electronic device of claim 13, wherein the instructions, when executed, cause the at least one processor to:

in response to identifying that the second housing is maintained at the second position over a designated time, control the driving unit to drive the driving unit at the second driving frequency to move the second housing by a second specified distance in the second direction, and based on the second housing being moved by the second designated distance, control the driving unit to drive the driving unit to move the second housing in the first direction.

* * * * *